(12) United States Patent
Paluch et al.

(10) Patent No.: US 6,561,535 B1
(45) Date of Patent: May 13, 2003

(54) HOSE CONTROL FOR PLANTER APPARATUS

(75) Inventors: Paul M. Paluch, Downers Grove, IL (US); James G. Jamilosa, Bolingbrook, IL (US)

(73) Assignee: Case, LLC, Racine, WI (US)

( * ) Notice: Subject to any disclaimer, the term of this patent is extended or adjusted under 35 U.S.C. 154(b) by 0 days.

(21) Appl. No.: 10/101,881

(22) Filed: Mar. 21, 2002

Related U.S. Application Data

(63) Continuation-in-part of application No. 10/062,612, filed on Jan. 31, 2002.

(51) Int. Cl.$^7$ .............................. B60D 1/00; A01B 5/00
(52) U.S. Cl. ................................. 280/491.2; 172/272
(58) Field of Search ....................... 280/491.2; 172/272, 172/274, 275

(56) References Cited

U.S. PATENT DOCUMENTS

| | | | | |
|---|---|---|---|---|
| 2,177,128 A | * | 10/1939 | Johnson | 138/110 |
| 2,704,018 A | * | 3/1955 | Oehler et al. | 172/441 |
| 3,060,972 A | * | 10/1962 | Sheldon | 138/120 |
| 3,284,036 A | * | 11/1966 | Nansel | 248/49 |
| 3,330,105 A | * | 7/1967 | Weber | 59/78.1 |
| 3,428,336 A | * | 2/1969 | Thurman | 280/482 |
| 3,612,318 A | | 10/1971 | Ramsey | |
| 4,269,429 A | * | 5/1981 | Eichstadt | 280/503 |
| 4,373,324 A | * | 2/1983 | Janos | 59/78.1 |
| 4,392,344 A | | 7/1983 | Gordon | |
| 4,487,218 A | | 12/1984 | Sifri | |
| 4,683,987 A | | 8/1987 | Sakata et al. | |
| 4,739,801 A | * | 4/1988 | Kimura et al. | 138/120 |
| 5,011,176 A | * | 4/1991 | Eppinette | 280/479.3 |
| 5,240,209 A | * | 8/1993 | Kutsch | 248/49 |
| 5,445,569 A | | 8/1995 | Blase | |
| 5,724,803 A | * | 3/1998 | Pea | 59/78.1 |
| 5,839,476 A | | 11/1998 | Blase | |
| 5,881,937 A | * | 3/1999 | Sadler | 224/509 |
| 6,374,589 B1 | * | 4/2002 | Kunert et al. | 59/78.1 |
| 6,408,889 B1 | * | 6/2002 | Komachi | 138/120 |

* cited by examiner

*Primary Examiner*—Paul N. Dickson
*Assistant Examiner*—Laura B. Rosenberg
(74) *Attorney, Agent, or Firm*—Rebecca L. Henkel

(57) ABSTRACT

An apparatus for linking first and second power ports on a variable length tongue assembly where the distance between the ports varies as a function of the degree to which the tongue assembly is extended, the apparatus including a receiver member that defines a receiver space for receiving the cable when the tongue assembly is in a retracted position, a flexible power cable that links the first and second ports together and that forms at least one curve proximate the first cable end and that is convex toward the receiving space, and a guide member that restricts bending of the cable between the curve and the second end such that, upon retracting the tongue assembly, the cable is forced into the receiving space and into a stowed position, at least one embodiment includes a sheath member that further restricts cable bending.

35 Claims, 17 Drawing Sheets

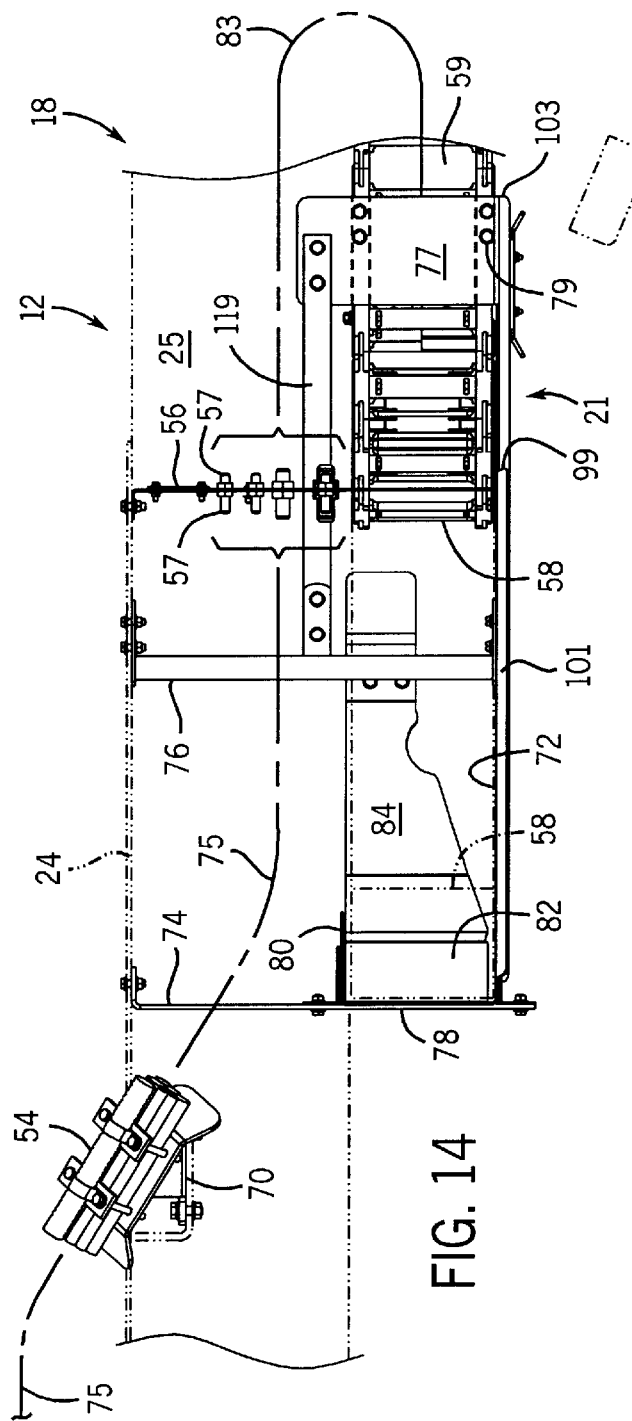
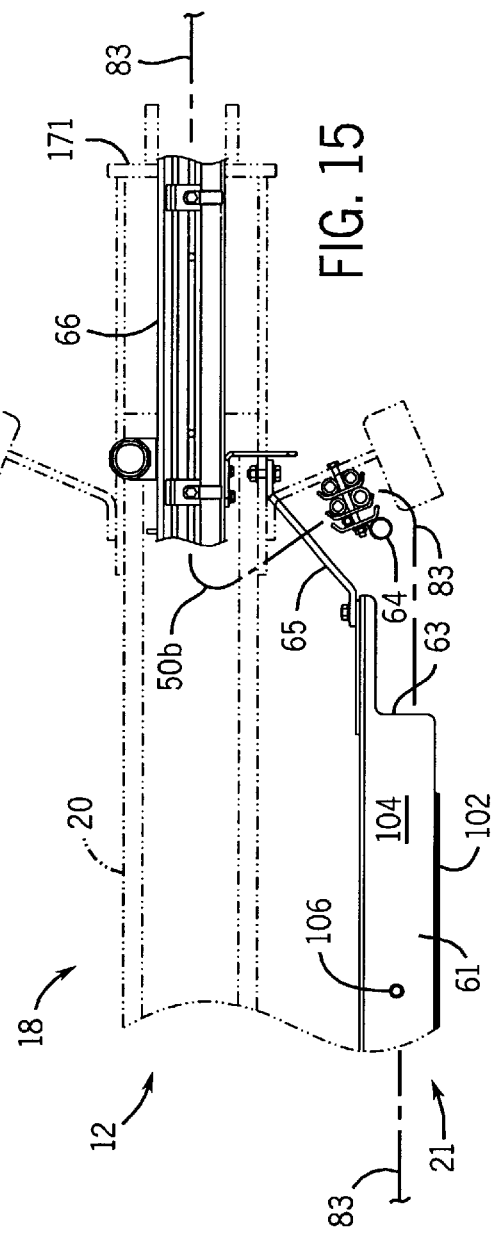

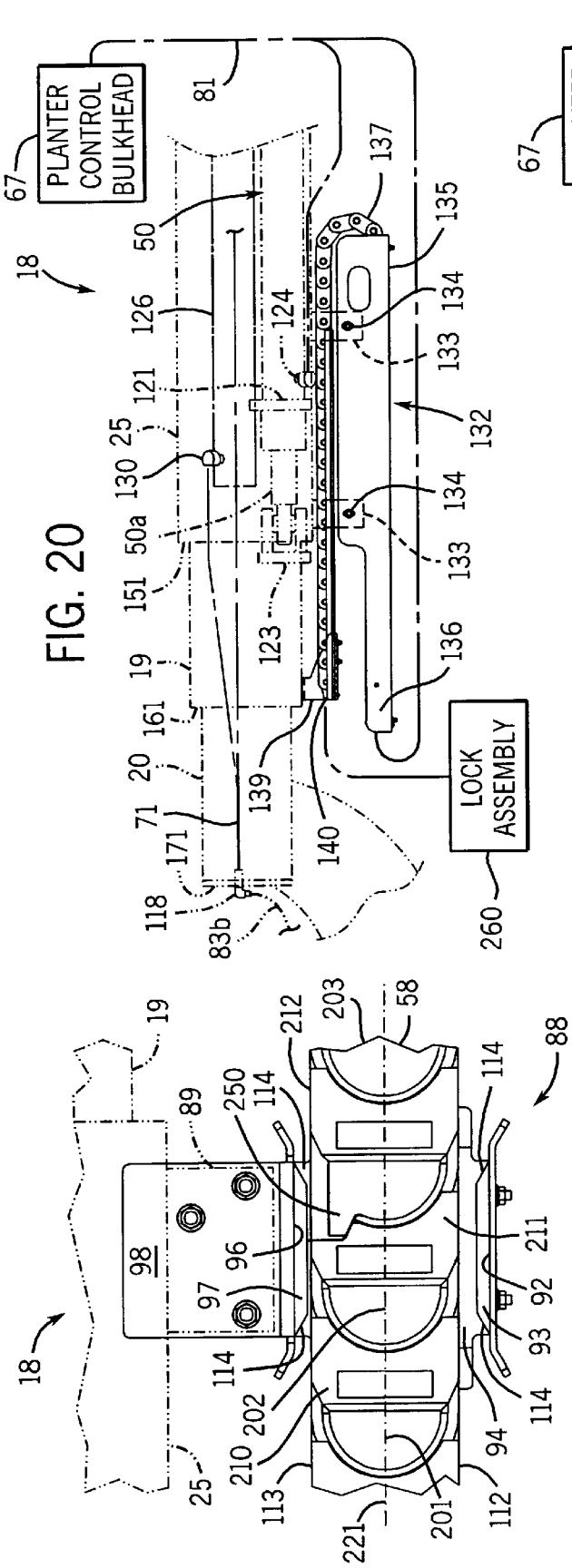
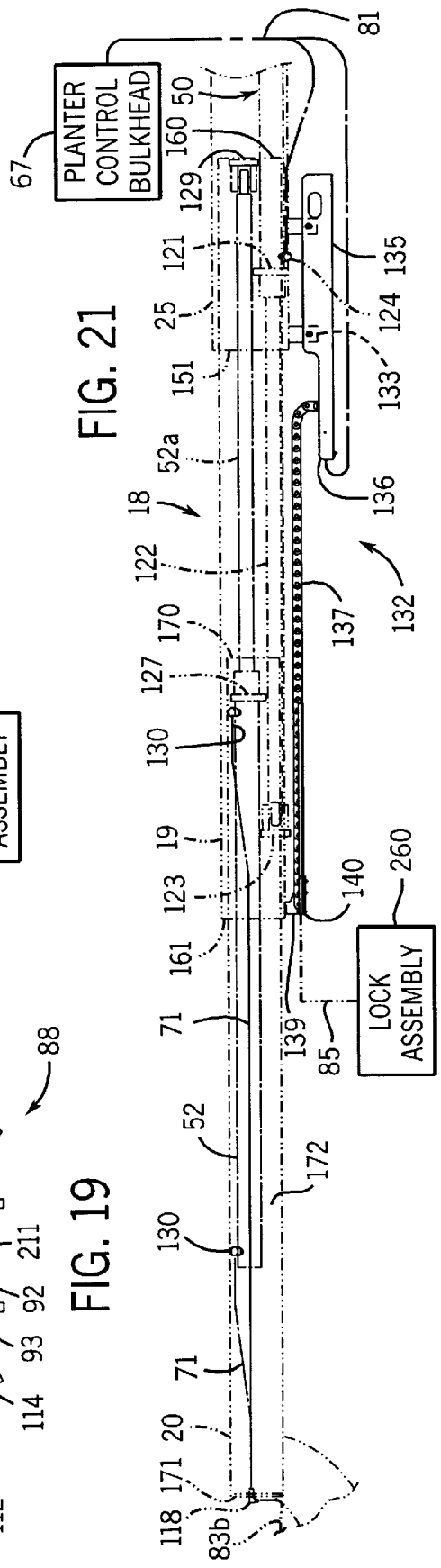

HOSE CONTROL FOR PLANTER APPARATUS

CROSS-REFERENCE TO RELATED APPLICATIONS

This application is a continuation in part of U.S. patent application Ser. No. 10/062,612 which was entitled "Planter Hitch Apparatus" and which was filed on Jan. 31, 2002.

FIELD OF THE INVENTION

The present invention relates generally to agricultural equipment and more specifically to a hose guide for use with an extendable multi-stage hitch assembly for linking an agricultural implement to a prime mover.

BACKGROUND OF THE INVENTION

Various types of agricultural implements have been developed that can be linked via an implement tongue member to a tractor hitch or other type of prime mover to facilitate different tasks including, for example, seeding, fertilizing and tilling. Hereinafter, unless indicated otherwise, the background of the invention and the present invention will be described in the context of an exemplary planter implement assembly.

While there are many different factors that have to be considered when assessing the value of a planter assembly, one relatively important factor is how quickly the assembly can accomplish the task that the assembly has been designed to facilitate. One way to increase task speed has been to increase planter assembly width thereby reducing the number of passes required to perform the implement's task for an entire field. Thus, for instance, doubling the width of the exemplary planter assembly generally reduces the time required to completely seed a field by half.

With the development of modern high-powered tractors and planter assemblies, many planter assemblies extend to operating field widths of 40 feet or more. Hereinafter when a planter assembly is extended into an operating configuration to accomplish a seeding task, the planter assembly will be said to be in an operating position and have an operating width.

Unfortunately, while expansive planter assembly operating widths are advantageous for quickly accomplishing tasks, such expansive widths cannot be tolerated during planter assembly transport and storage. With respect to transport, egresses to many fields are simply not large enough to accommodate transport of a 40 plus foot planter assembly into and out of the fields. In addition, often buildings and fences obstruct passageways and therefore will not allow transport. Moreover, many farm fields are separated by several miles and farmers have to use commercial roadways to transport their planter assemblies to and from fields. Essentially all commercial roadways are not designed to facilitate wide planter assembly transport.

Recognizing the need for expansive planter assembly operating widths and relatively narrow transport widths, the industry has developed some solutions that facilitate both transport and operating widths. To this end, one solution has been to provide piece-meal planter assemblies that can be disassembled into separate sections and stacked on a wheel supported carrier member or on a separate trailer for transport. Obviously this solution is disadvantageous as it requires excessive labor to assemble and disassemble the planter assemblies between transport and intended use and may also require additional equipment (e.g., an additional trailer).

Another solution has been to provide a folding planter assembly configuration. For instance, in a "scissors type" configuration, where a planter assembly chassis is supported by wheels, right and left implement bars are pivotally mounted to the chassis where each bar is moveable between an operating position extending laterally from the chassis and a transport position where the bar is forwardly swingable over the tongue member and supportable by the tongue member during transport. As another instance, "pivotal-type" configurations provide a single implement bar centrally mounted for pivotal movement on a wheel supported carrier platform where the single bar is pivotable about the mount so that half of the bar extends over the tongue member and is supportable thereby and the other half of the bar extends away from the tractor behind the chassis. In either of these scissors or pivotal configurations, the tongue member has to be long enough to accommodate half the implement bar length plus some clearance required to allow a tractor linked to the tongue member to turn left and right. Thus, for instance, where the planter assembly operating width is 40 feet, the tongue member generally has to be greater than 20 feet long.

While task speed is one important criteria with which to judge planter assembly value, one other important criteria is planter assembly effectiveness and efficiency. In agricultural endeavors, perhaps the most important measure of effectiveness is yield per acre. For this reason, when seeding a field, a farmer wants to seed every possible square foot of the field and thereafter, when maintaining (i.e., tilling, fertilizing, etc.) and harvesting a field, the farmer wants to avoid destroying the plants in the field. To maximize field seeding, farmers typically travel along optimal field paths. For instance, to ensure that seed is planted along the entire edge of a field, a farmer typically starts seeding the field by first traveling around the edge of the field with a seeding implement at least once and often two or more times along adjacent consecutively smaller paths prior to traveling in parallel rows through the field. These field edge paths are generally referred to in the industry as headland passes. By performing one or more headland passes about a field edge prior to performing parallel passes, the farmer provides a space for turning the tractor and implement around between parallel passes while still covering the entire space along the field edge.

While headland passes increase overall field coverage, whenever a tractor is driven over field sections that have already been seeded, the tractor and planter assembly wheels crush the seeds or growing plants that they pass over and therefore reduce overall field production (i.e., yield per acre). For this reason, as known in the industry, where possible, farmers routinely attempt to reduce the number of headland passes required in a field.

Unfortunately, the number of headland passes required to facilitate complete field coverage is related to the turning radius of a tractor and planter assembly combination and the combination turning radius is directly related to the length of the tongue member between the planter assembly and the tractor. Thus, for instance, where the tongue is six feet long the turning radius may require only one headland pass while a twenty foot long tongue may require two or more headland passes to facilitate complete coverage.

Recognizing that a short tongue during planter assembly operation reduces the number of required headland passes and therefore increases efficiency and that a long tongue is desirable to accommodate pivotal and scissors type implement configurations, some industry members have developed staged tongue members that expand to accommodate implement transport and retract to provide a minimal turning radius during implement operation. One of these solutions provides a single stage telescoping tongue member including a first tongue member mounted to a planter assembly chassis and a second tongue member that is telescopically received in the first tongue member. To facilitate expansion and retraction, a hydraulic cylinder is positioned within one of the first and second tongue members with a base member mounted to one of the tongue members and a rod secured to the other of the tongue members. With relatively large implements and tractors, the force required by the cylinder is relatively large. By placing the cylinder inside the tongue members, cylinder force is evenly distributed thereby reducing cylinder wear, reducing cylinder requirements and increasing the useful cylinder life cycle.

While better than non-telescoping tongue members, unfortunately, single stage members cannot telescope between optimal maximum and minimum lengths. For this reason, where single stage tongue members have been employed, either extended implement operating width has been minimized or extra headland passes have been used to accommodate a larger than optimum turning radius.

One other solution has been to provide a multi-stage tongue member that is able to telescope between optimal maximum and minimum lengths. Designing workable multi-stage tongue assemblies, however, has proven to be a difficult task. To this end, a separate cylinder is required for each stage in a multi-stage assembly. For instance, in a two stage assembly at least two cylinders are required. Unfortunately, in the case of a retracted multi-stage tongue assembly, the retracted assembly can only accommodate a single internally mounted cylinder (i.e., a cylinder mounted within the internal tongue assembly member). As indicated above, to balance cylinder load during operation and thereby minimize cylinder wear and increase useful cylinder lifecycle, the industry has opted to place tongue dedicated cylinders inside tongue member passageways and external tongue dedicated cylinders have not been considered a viable option.

One exemplary and seemingly workable multi-stage tongue assembly is described in U.S. Pat. No. 5,113,956 which is entitled "Forwardly Folding Tool Bar" and which issued on May 19, 1992 (hereinafter "the '956 patent"). The implement configuration in the '956 patent teaches a scissors-type implement having left and right bar members mounted to a wheel supported chassis for pivotal rotation between an extended operating position and a transport position over the tongue assembly. The tongue assembly is mounted to the chassis and extends toward a tractor including several (e.g., 5) telescoped tongue members including a distal tongue member 14 that actually links to a tractor hitch. To move the bar members between the operating and transport positions the '956 patent teaches that first and second hydraulic cylinders are mounted between the chassis and a point spaced from the chassis on each of the right and left bar members, respectively. By extending cylinder rods, the bar members are driven into extended operating positions and when the rods are retracted the bar members are driven into transport positions.

The '956 patent teaches that the tongue assembly can be extended and retracted while the bar members are driven between their operating and transport positions and by the first and second hydraulic cylinders by attaching braces between the bar members and the distal tongue member. More specifically, a first rigid brace is pivotally secured at one end about midway along the right bar member and so as to form an acute angle therewith and at an opposite end to the distal tongue member and a second rigid brace is pivotally secured at one end about midway along the left bar member so as to form an acute angle therewith and at an opposite end to the distal tongue member.

The '956 patent teaches that when the cylinder rods are retracted so that the bar members are in the transport position, the tongue assembly is extended so that the distal end of the assembly clears the ends of the bar members. When the cylinder rods are extended, the bar members are driven toward their extended operating positions and the braces simultaneously pull the distal tongue member toward the chassis thereby causing the tongue assembly to retract. By reversing the rods so that the rods extend, the braces force the distal tongue member away from the chassis thereby causing the tongue assembly to extend. Thus, the '956 patent configuration replaces the tongue dedicated rods with the first and second braces on opposite sides of the tongue assembly, the braces in effect operating as rods to extend and retract the tongue assembly and providing a balanced load to the distal tongue member during extension or retraction.

The '956 solution, like other solutions, has several shortcomings. First, because the '956 patent configuration cylinders are linked between the chassis and the bar members, in the case of some planting assemblies, the cylinders will get in the way of planting assembly components (e.g., seed metering devices, ground engaging coulters, etc.). Similarly, because of the locations of the braces (i.e., secured between central points of the braces and the distal tongue member), the braces also will obstruct use of certain planting assembly components.

Second, in order to simultaneously drive the bar members between the operating and transport positions and drive the distal tongue member between the retracted and extended positions, the cylinders have to be relatively large and therefore expensive. One way to reduce cylinder size is to modify the planter assembly configuration to increase the acute angles that the braces form with each of the bar members when the bar members are in the extended operating positions. This solution, however, leads to a third problem with the '956 patent configuration. Specifically, to simultaneously provide a workable design including braces and accommodate larger acute angles that enable the use of smaller cylinders, the overall retracted tongue assembly length must be increased which is contrary to the primary purpose for which the assembly has been designed (i.e., to reduce tongue length during planter assembly operation and increase tongue length during planter assembly transportation).

One solution to the problems above is described in the related U.S. patent application Ser. No. 10/062,612 (hereinafter "the related reference") which is entitled "Planter Hitch Apparatus", which is commonly owned with the present invention and which is incorporated herein by reference in its entirety. The related reference recognizes that where separate hydraulic cylinders have been provided for each stage in a multi-stage tongue assembly, the cylinder loads are shared between the separate cylinders and therefore the overall load requirements on each stage cylinder are reduced appreciably. Where cylinder load is reduced the cylinder can be placed "off-load" center without appreciably affecting load balance on the cylinder and therefore without appreciably reducing cylinder lifecycle.

Thus, it has been recognized that, in the case of a multi-stage tongue assembly that can accommodate only a single internally mounted cylinder, additional externally mounted cylinders can be provided for each of the additional stages. For instance, in the case of a two stage assembly, a first stage may be motivated via an internally mounted cylinder and a second stage may be motivated via an externally mounted cylinder. In this case, the external cylinder will only assume a fraction (e.g., 50%) of the overall load and therefore can be placed off-load center without appreciable effects and without a balancing cylinder on the other side of the tongue assembly.

According to one embodiment described in the related reference, a multi-stage tongue assembly includes a separate hydraulic cylinder for each stage where at least one of the cylinders is mounted externally of the tongue members (see FIGS. 1 and 7 generally). For instance, in the case of a two stage assembly including a first tongue member mounted to the underside of a carrier platform, a second tongue member telescopically received within the first member and a third tongue member telescopically received within the second member, one cylinder is mounted externally and the other cylinder may be mounted either internally or externally.

The related reference also teaches a hydraulic automated locking mechanism for locking the tongue members in extended and retracted positions. To this end, in the case of the two-stage tongue assembly described above, the locking mechanism includes two separate locking assemblies, a first assembly mounted to the distal end of a first tongue member and a second assembly mounted to the distal end of the second tongue member. Thus, in this case, hydraulic fluid has to be provided to each of the first and second locking assemblies.

In most cases planter assemblies (and agricultural implements generally) that are pulled by tractors or other types of prime movers do not come equipped with their own power plants. This is because most farmers employ many different implements and to provide a separate power plant for each implement would render the combined suite of implements far to costly for most farmers. Instead, tractors, the farmer's primary mechanical tools, are typically constructed such that they have power capacities sufficient to both transport an attached implement as well as provide power to run the implement. For instance, in the case of the planter assembly described above and in greater detail below, a tractor linked to a planter hitch assembly would provide hydraulic fluid to any planter assembly cylinders required to rotate the implement between transport and functional positions, to raise and lower support wheels, to raise and lower an implement bar, to extend and retract the telescopic tongue assembly and to control the locking assemblies. In addition, the tractor would also provide electrical power to the hydraulic valves (e.g., solenoid valves), any blower mechanisms for seed delivery, to the row unit metering devices and to any other devices requiring electrical power (e.g., tail lights, sensors, etc.).

To provide power to a planter assembly, a tractor typically comes equipped with one or, in most cases, a plurality of power or power source ports that are positioned proximate a hitch receiving member and the planter assembly is equipped with one or more power receiving ports. Power cables are then provided to link associated ports (i.e., hydraulic to hydraulic, electrical to electrical, etc.) together. Generally the planter assembly pivots about the hitch receiving assembly with respect to the tractor and therefore the power cables are constructed to flex and accommodate a degree of pivoting consistent with a minimum tractor turning radius.

As in most assemblies including power cables, in the case of a planter assembly, the power cables have to be protected from damage. For instance, if the hydraulic hose providing fluid to the internal tongue member of a multi-stage tongue assembly is severed with the tongue in the retracted and functional position (see FIG. 1), the planter assembly cannot be rotated into the transport position (see FIG. 9) and hence the assembly cannot assume a suitable configuration for transport along most roadways.

Generally, one solution for protecting a power cable has been to mount the cable such that the cable's relative juxtaposition with respect to the components that the cable is mounted to remains unchanged and such that the cable resides in a space devoid of other moving components. For instance, in the case of a hydraulic hose and a non-staged tongue assembly (i.e., a non-telescoping tongue member), the hose can be mounted directly to the external surface of the non-staged tongue member.

Unfortunately, in the case of a multi-staged tongue assembly power cable protection is a more difficult task. To this end, in the case of a multi-staged tongue assembly the length of the tongue assembly varies appreciably and therefore the relative juxtapositions of the power cables with respect to the tongue members likewise change. In fact, to accommodate the variable tongue assembly lengths, the effective lengths of the power cables have to be altered. For instance, assume that a multi-staged tongue has five foot and fifteen foot lengths when in its retracted and extended positions, respectively. In this case the effective lengths of the power cables would have to vary by ten feet.

In addition to the cables that provide power from the source ports to the receiving ports on a tractor-planter combination, in the case of a multi-stage tongue assembly, some embodiments require a variable length cable to provide power to various parts of the tongue assembly. To this end, again assuming a two-stage tongue assembly and first and second hydraulic locking assemblies mounted to the distal ends of the first and second tongue members, respectively, the position of the distal end of the second member relative to a hydraulic port on a carrier platform will vary depending on how far the second tongue member is extended from the first member. Thus, the effective length of the cable linked to the second locking assembly must be variable as well. Hereinafter cables that can provide variable effective lengths will generally be referred to as variable length cables.

One solution for providing a variable length cable has been to provide a spring loaded cable reel at one end of the cable that operates to take up cable slack as required effective length is reduced. While cable reels operate well in the case of vertically aligned members (e.g., the uprights on a fork lift), such reels have not proven effective in the case of horizontally aligned members such as a multi-staged tongue assembly for several reasons. First, spring loaded reels typically cannot take up enough slack to eliminate vertical cable sag. A sagging cable can become snagged on rocks or other items extending up from the ground below and therefore cannot be tolerated.

Second, planter assemblies (and other implement assemblies for that matter) often require ten or more power cables linking the source and receiving ports together and it is impractical to provide ten or more separate cable reels for this purpose.

Third, even if ten or more reels were provided for this purpose it is unclear exactly where so many reels could possibly be located on a typical planter assembly. For instance, in the case of the pivotal planter type assembly described above, reels generally cannot be mounted atop the carrier platform as the implement bar and corresponding components have to rotate through the space above the platform. In addition, there is very little space under the platform because the support wheels and often other components have to be mounted there. For instance, U.S. patent application No. 10/090,538 which is entitled "Planter with Centrally Mounted Coulter Apparatus" which was filed on Mar. 4, 2002 and is commonly owned with the present invention, illustrates a centrally mounted coulter apparatus that has to be mounted below and in front of carrier platform support wheels in order to operate properly. This and other configurations leave very little space below the platform to accommodate reel assemblies.

Fourth, even two adjacent cable reels would likely be inoperable as adjacent cables could and would likely become entangled during planter operation. This problem would only be exacerbated where the number of cables is increased.

A problem similar to that of the power cable problem described above also exists with respect to providing hydraulic fluid to distal stages of a multistaged tongue assembly. For instance in the case of a two stage tongue assembly including a hydraulic locking assembly mounted to one of the telescoping tongue members, the distance between a supply port on a carrier frame and the locking assembly ports changes and hence the lengths of hoses to supply the ports likewise must change.

Therefore a need exists for an apparatus that can be used to provide a variable effective length power cable. In addition, it would be advantageous to provide a protected variable length multi-cable apparatus for use with a planter assembly.

SUMMARY OF THE INVENTION

It has been recognized that a receiving space can be defined for, as its label implies, receiving power cables when a variable length tongue assembly is retracted where the receiving space is limited to space that is not required for other planter assembly components. It has also been recognized that a sheath member and a guide member or assembly can also be provided that together restrict relative cable motion and other uncontrolled cable movement so that cable positions are always controlled.

Consistent with the above realizations, the present invention includes an apparatus for use with a carrier assembly including a wheel supported carrier member and a tongue assembly including a stationary member mounted to the carrier member and an extendable tongue member receivable within and extendable to a substantially fully extended position from the stationary member along a transport axis, a stationary port fixedly mounted with respect to the stationary member and a moveable port fixedly mounted to the extendable member such that the distance between the ports depends on the degree of extendable member extension, the apparatus for linking the ports and comprising a receiver assembly mounted to the carrier assembly and including at least a first wall member forming a substantially upwardly facing surface below a receiving space and adjacent a first of the stationary and moveable ports and a corresponding first of the stationary and extendable members, a flexible power cable having stationary and moveable cable ends secured to the stationary and moveable ports, respectively, with the tongue assembly in the fully extended position, the cable forming at least one curve having a convex surface that faces into the receiving space proximate a first of the cable ends and a guide member mounted to the tongue assembly and substantially restricting cable bending between the curve and a second of the cable ends.

In some embodiments the apparatus further includes a protective sheath member that forms a passageway having first and second ends proximate the stationary and moveable ports, respectively, and, wherein the cable is juxtaposed within the passageway. Here the sheath member may substantially restrict vertical bending of the cable. More specifically, the sheath member may include a plurality of chain link members that define the passageway where link members rotate about substantially vertical axis with respect to adjacent link members. Three adjacent vertical axis may be substantially in a single plane when a corresponding link member pair is aligned and, at least a first subset of link member pairs may include first and second link members where first member rotation with respect to the second member is restricted to one side of the single plane. In addition, at least a second subset of link member pairs may include first and second link members where the first member is free to rotate with respect to the second member to both sides of the single plane.

In one embodiment the stationary port and stationary member are the first port and first member, respectively.

The apparatus may include a deflector member mounted to the carrier assembly and forming a deflection surface having first and second ends proximate the stationary tongue member and the receiver member, respectively, the first end aligned with the transport axis and the deflection surface at least in part sloping toward the receiving space. Here the deflection surface may form a curve from the stationary tongue member to the second end of the deflection surface that is substantially perpendicular to the transport axis. The receiver assembly may further include a substantially vertical second wall member that extends up from the first wall member and extends from the second end of the deflection surface along the length of the receiving space where the receiving space is on the same side of the second wall member as the tongue assembly.

In some embodiments the extendable member extends in a transport direction, each of the first and second sheath member ends are open in the transport direction and the curve is convex in a direction opposite the transport direction. The carrier assembly may include a carrier platform having a front edge that faces substantially in the transport direction, the sheath member may be mounted below the carrier platform and the first end of the sheath member may be mounted below the front edge.

The invention also includes an apparatus for use with an agricultural assembly and for providing a variable length drawbar for a carrier assembly including a wheel supported carrier member, the apparatus comprising a tongue assembly including a stationary member mounted to the carrier member and an extendable tongue member receivable within and extendable to a substantially fully extended position from the stationary member along a transport axis, a stationary port fixedly mounted with respect to the stationary member and a moveable port fixedly mounted to the extendable member such that the distance between the ports depends on the degree of extendable member extension, a receiver assembly mounted to the carrier assembly and including at least a first wall member forming a substantially upwardly facing surface below a receiving space and adjacent the stationary port and the corresponding stationary member, a flexible power cable having stationary and moveable cable ends secured to the stationary and moveable ports, respectively, with the tongue assembly in the fully extended position, the cable forming at least one curve having a convex surface that faces into the receiving space proximate the stationary cable end and a guide member mounted to the tongue assembly and substantially restricting cable bending between the curve and a second of the cable ends.

The invention also includes a method for use with a carrier assembly including a flexible power cable, a wheel supported carrier member and a tongue assembly including a stationary member mounted to the carrier member and an extendable tongue member receivable within and extendable to a substantially fully extended position from the stationary member along a transport axis, a stationary port fixedly mounted with respect to the stationary member and a moveable port fixedly mounted to the extendable member such that the distance between the ports depends on the degree of extendable member extension, the cable linked at first and second ends to the stationary and moveable ports, respectively, a receiving space formed adjacent a first of the stationary and moveable ports and a corresponding first of the stationary and extendable members, the method for configuring the cable for storage when the tongue assembly is retracted, the method comprising the steps of, with the tongue assembly in an extended configuration, arranging the cable to form a curve that is convex into the receiving space proximate a first of the cable ends and substantially restricting cable bending between the curve and a second of the cable ends.

In one embodiment the step of restricting includes providing a sheath member that that forms a passageway and that restricts bending to within a single plane and positioning the cable within the passageway. More specifically the step of providing a sheath member may include providing a chain link assembly including chain links that rotate about axis that are substantially perpendicular to the transport axis. Moreover, the step of providing may include providing the assembly where at least some of the chain links are restricted to rotating to a single side of adjacent link members.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention

BRIEF DESCRIPTION OF THE DRAWINGS

FIG. 14 is a horizontal view of the power cable carrier mounted to the tray platform, shown in the extended position, taken along lines 14—14 of FIG. 13;

FIG. 15 is a top view of the power cable trough mounted to the telescoping tongue, shown in the extended position, taken along lines 15—15 of FIG. 13;

FIG. 19 is a detail top view of the power cable carrier and support guide assembly, taken along lines 19—19 of FIG. 17;

FIG. 20 is a horizontal view of the tongue power hose carrier mounted to the telescoping tongue, shown in the retracted position, taken along lines 20—20 of FIG. 12; and FIG. 21 is a horizontal view of the tongue power hose carrier mounted to the telescoping tongue, shown in the extended position, taken along lines 21—21 of FIG. 13.

DETAILED DESCRIPTION OF THE PREFERRED EMBODIMENTS

Figure 1:
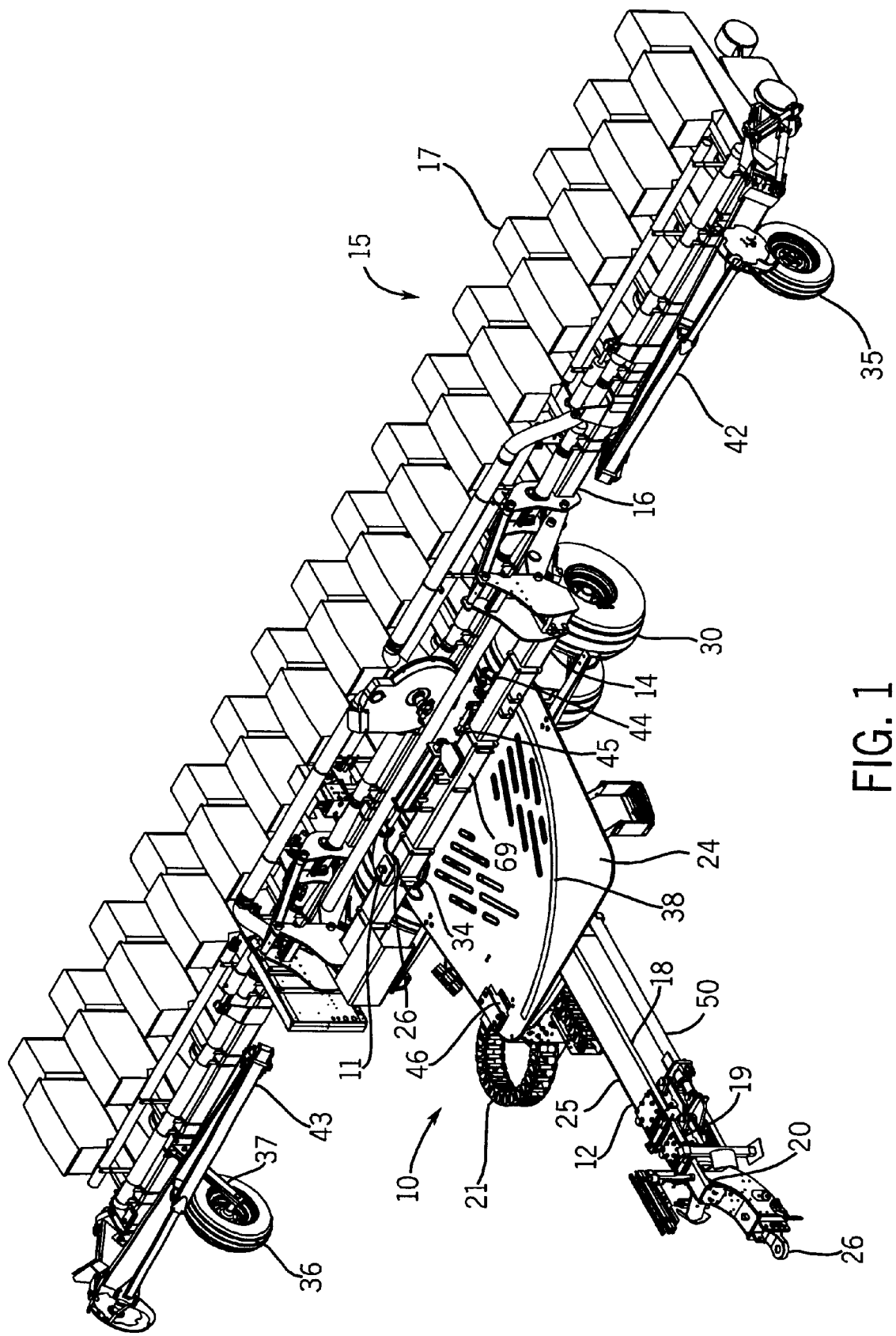
FIG. 1 is a is perspective view of a preferred embodiment of a planter apparatus constructed in accordance with one embodiment of the present invention.

Referring now to FIGS. 1 through 4, a preferred embodiment of the present invention will be described in the context of an. agricultural assembly 10 which includes a carrier frame assembly 12, a main frame assembly 69 and an implement assembly 15. As its label implies, carrier frame assembly 12 includes components configured to facilitate transport or carrying of other assembly 10 components. Main frame assembly 69 includes components that generally remain with the carrier frame assembly and that are used to mount different implement assemblies thereto. As its label implies implement assembly 15 includes components used to carry out a specific agricultural process corresponding to a specific implement. For instance, the components that comprise the implement assembly may be used for tilling, fertilizing, planting, etc. Main frame assembly 69 is mounted to carrier frame assembly 12 and implement assembly 15 is mounted to main frame assembly 69.

The present invention generally resides in the carrier frame assembly 12 and, more particularly, in a power cable sub-assembly 21 (hereinafter "the cable assembly 21") that forms part of the carrier frame assembly 12. For this reason, hereinafter, first, an exemplary implement assembly 15 and the main frame assembly 69 are described in minimal detail and thereafter carrier frame assembly 12 and cable assembly 21 are described in greater detail.

Referring still to FIGS. 1 through 3 and 5 through 9, the exemplary implement assembly 15 includes a bar member 16, row units 17 (e.g., planting assemblies including seed hoppers, coulters and seed metering devices), wheels 35, 36, wheel support members 37 and extendable markers 42, 43. Bar member 16 is typically a rigid steel rectilinear bar having dimensions within the six by six to ten by ten range and extends along the length of implement assembly 15. Bar 16 is generally mounted to main frame assembly 69 in any manner known in the art and the relationship between implement assembly 15 and the main frame assembly 69 is adjustable.

Wheels 35 and 36 are mounted via wheel support members 37 at opposite ends of bar 16 and are generally positionable in two positions with respect to the ground (not illustrated). First, as illustrated in the figures, wheels 35 and 36 and/or the entire implement assembly 15 may be manipulated via hydraulic cylinders or the like such that wheels 35 and 36 are in an upright position where the wheels 35 and 36 clear the ground below. Second, wheels 35 and 36 or the entire implement assembly 15 may be manipulated such that wheels 35 and 36 contact the ground below and support the ends of the implement assembly there above with implement components either above the ground or, depending on implement type, perhaps partially engaging the ground.

Markers 42 and 43, like wheels 35 and 36, are mounted at opposite ends of bar 16 and generally extend from bar 16 to a front side (see FIGS. 1, 5, etc) of the implement assembly. Operation of markers 42 and 43 is well known in the art and therefore will not be explained here in detail. Suffice it to say markers 42 and 43 may assume either a stored position (see FIG. 5) where the markers are generally retracted or an extended and operating position (not illustrated) where the markers 42 and 43 are unfolded and extend at least in part in the direction away from units 17 and toward a tractor (not illustrated) that may be attached to assembly 10.

Figure 4:
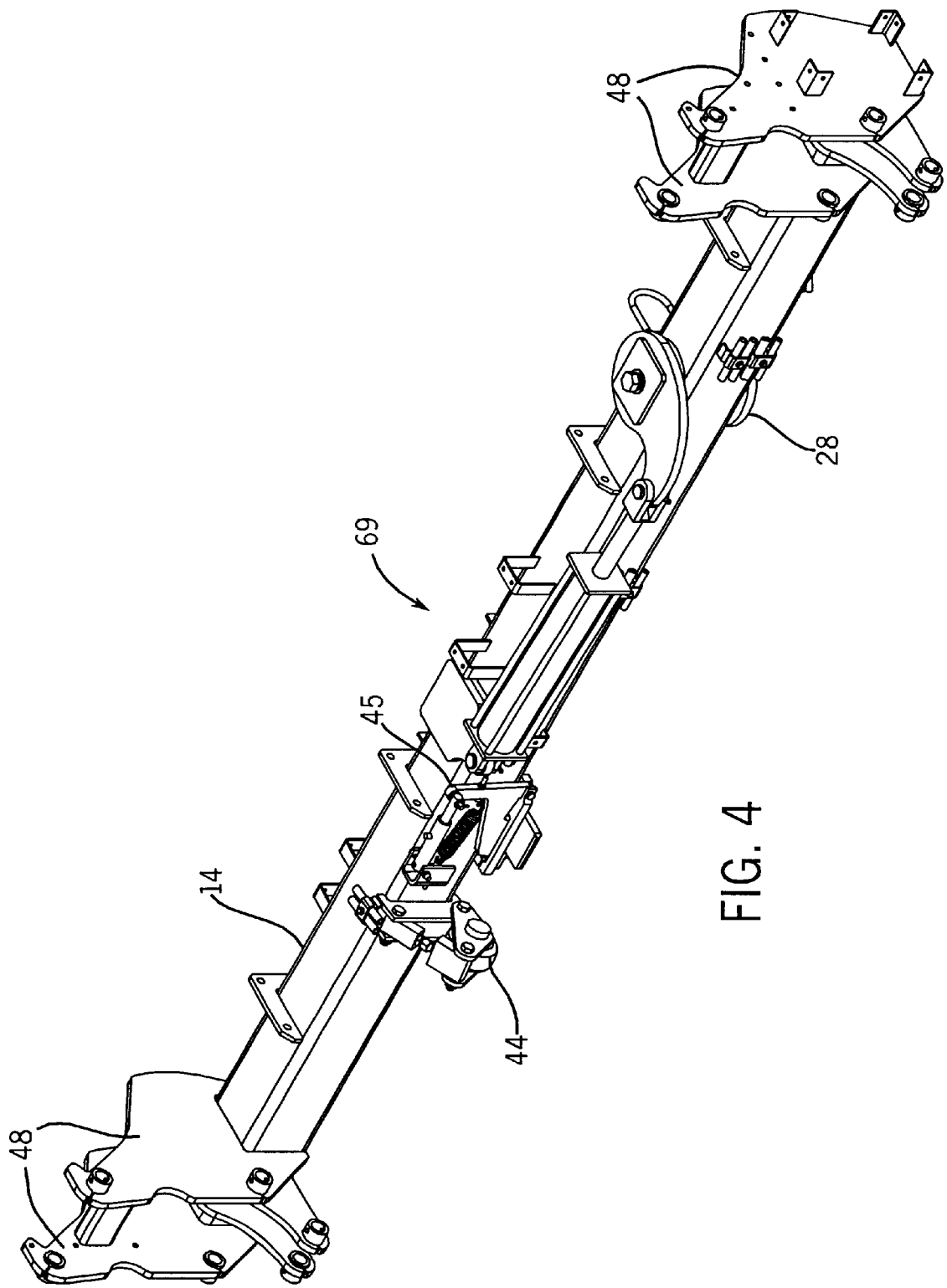
FIG. 4 is a perspective view of a mainframe assembly used with the configuration of FIG. 1.
Figure 5:
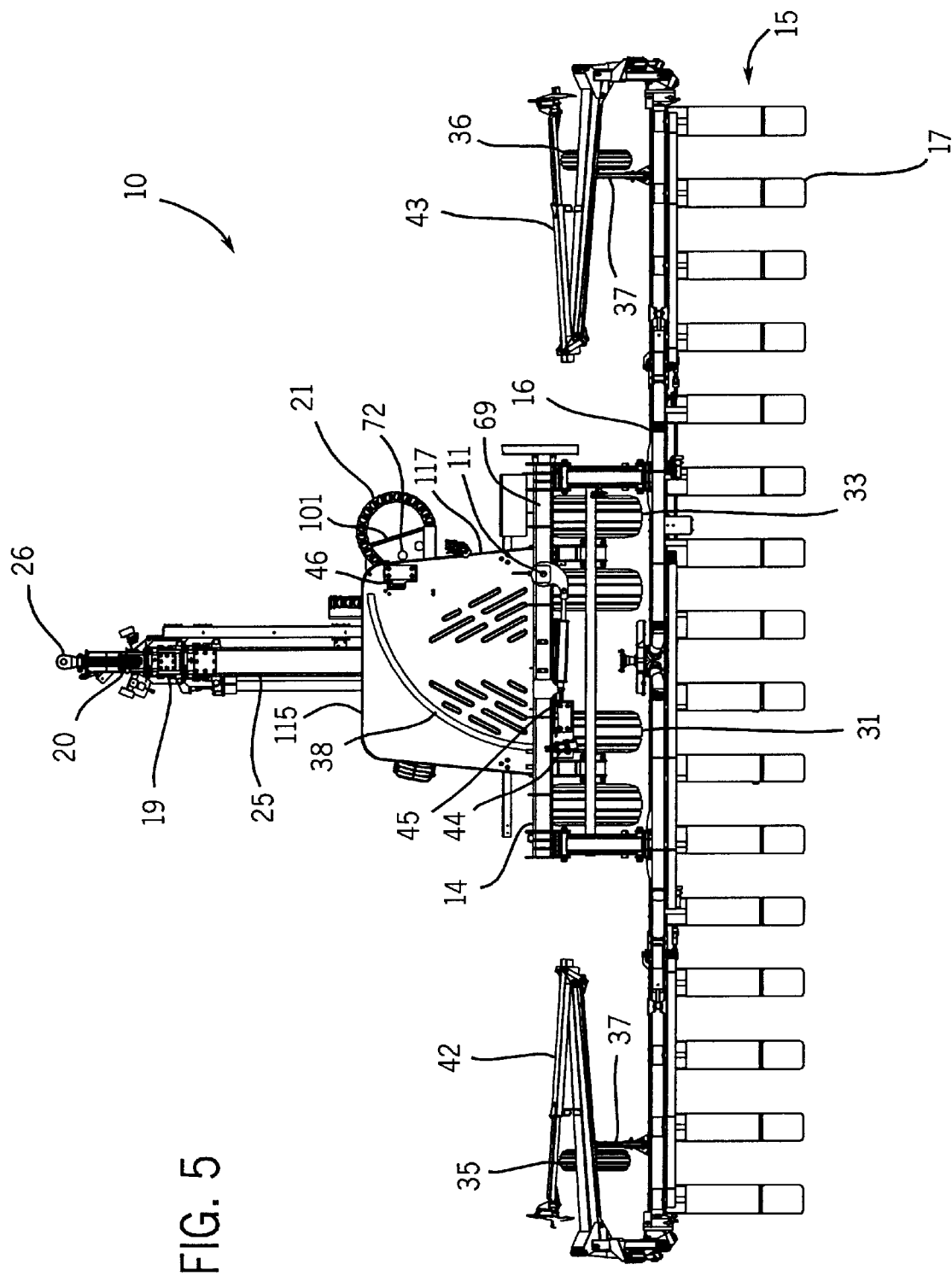
FIG. 5 is a top plan view of the embodiment of FIG. 1 in an extended operating position.
Figure 6:
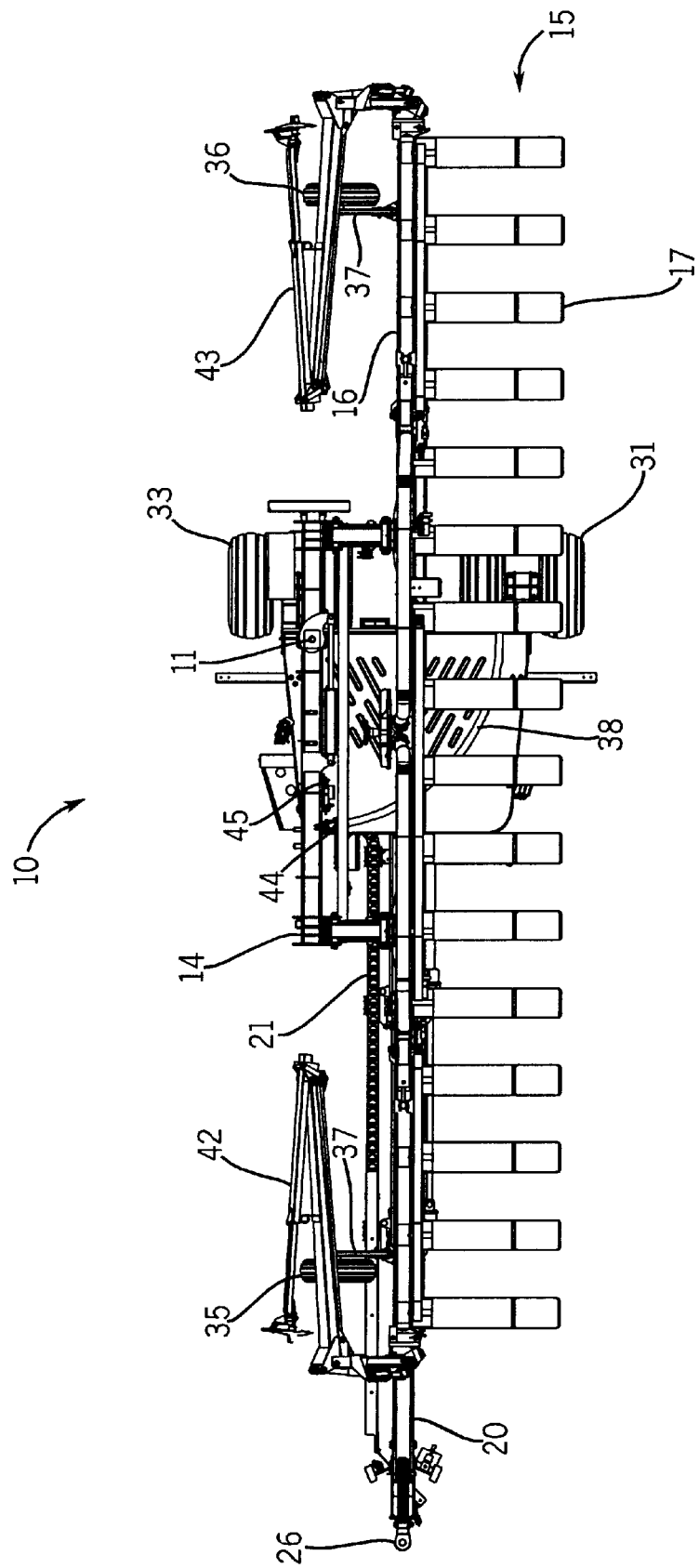
FIG. 6 is a top plan view of the embodiment of FIG. 1 in a transport position.

Referring now to FIG. 4, the main frame assembly 69 includes, among other components, a main frame bar member 14, a roller assembly 14, a latching assembly 45 and a pivot plate 28. Pivot plate 28 is mounted to an undersurface of bar member 14 about one-fourth the length of bar member 14 from a first end thereof and forms a downwardly opening pivot receiving aperture (not observable in the Figs.) for receiving a carrier frame assembly pivot pin (see 34 in FIG. 2) which is described in more detail below. Latch assembly 45 cooperates with other system latching components (e.g., see two instances of latch 46 in FIG. 2) mounted on the carrier frame assembly 12 to lock the main frame assembly 69 and attached implement assembly 15 in either a transport position (see FIGS. 6, 8 and 9) or an operating position (see FIGS. 1 and 5). Precise configuration and operation of assembly 45 is not explained here in the interest of simplifying this explanation.

Roller assembly 44 is mounted to bar member 14 at a point about one-fourth the length of bar 14 from a second bar 14 end (not numbered) and includes at least one roller mounted for rotation in a direction substantially perpendicular to the length of bar member 14 and that is formed so as to be supportable on a track runner (e.g., 38 in FIG. 2) formed by a carrier frame platform (see platform 24 in FIGS. 2 and 3) that is explained in greater detail below. Thus, plate 28 and assembly 14 are, in the present example, essentially equispaced along the length of bar 14. Positioning of plate 28 and wheel assembly 44 is important to ensure proper balancing of the attached implement assembly 15 and is generally a function of how best to balance assembly 15 about a carrier assembly axis 310 which is also referred to herein as a transport axis and that defines a transport direction along which the tongue assembly 18 extends (see FIGS. 1 and 2).

Bar member 14 is configured so as to have means for attaching the implement assembly bar member 16 to main frame bar member 14 at either end of the main frame bar member 14. Representative views that show attachment are FIGS. 1 and 5 through 7. While many linking means are contemplated, as illustrated in FIG. 4, exemplary means include rigid, substantially vertical and upwardly extending receiving plates collectively identified by numeral 48 that extend in parallel from opposite ends of bar 14 and bolt holes (not separately numbered) for receiving some type of clamping brackets.

Figure 8:
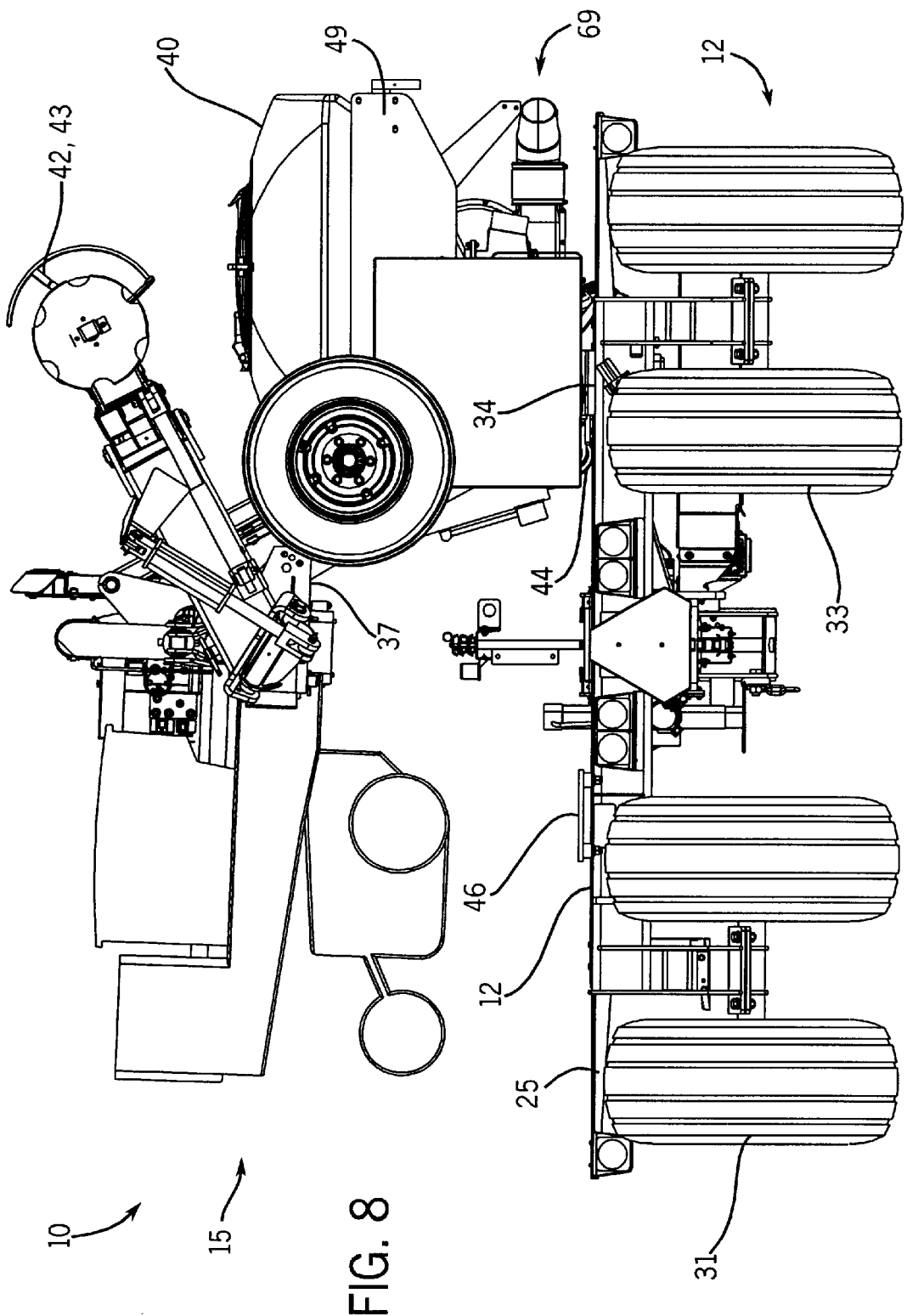
FIG. 8 is a rear perspective view of the embodiment illustrated in FIG. 1 with storage units attached and in the transport position.
Figure 9:
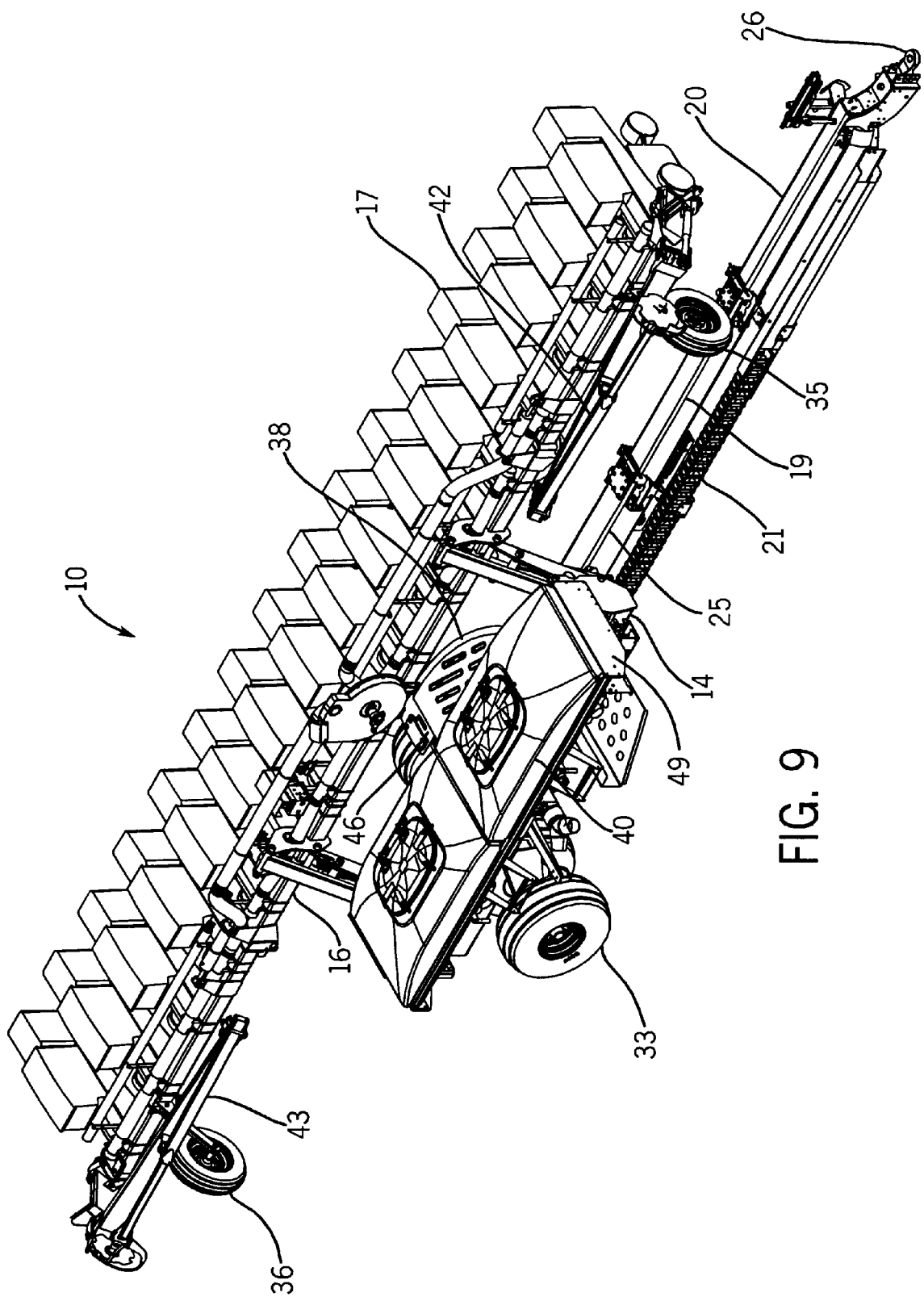
FIG. 9 is a perspective view of the embodiment of FIG. 8 with storage units in the transport position.
Figure 10:
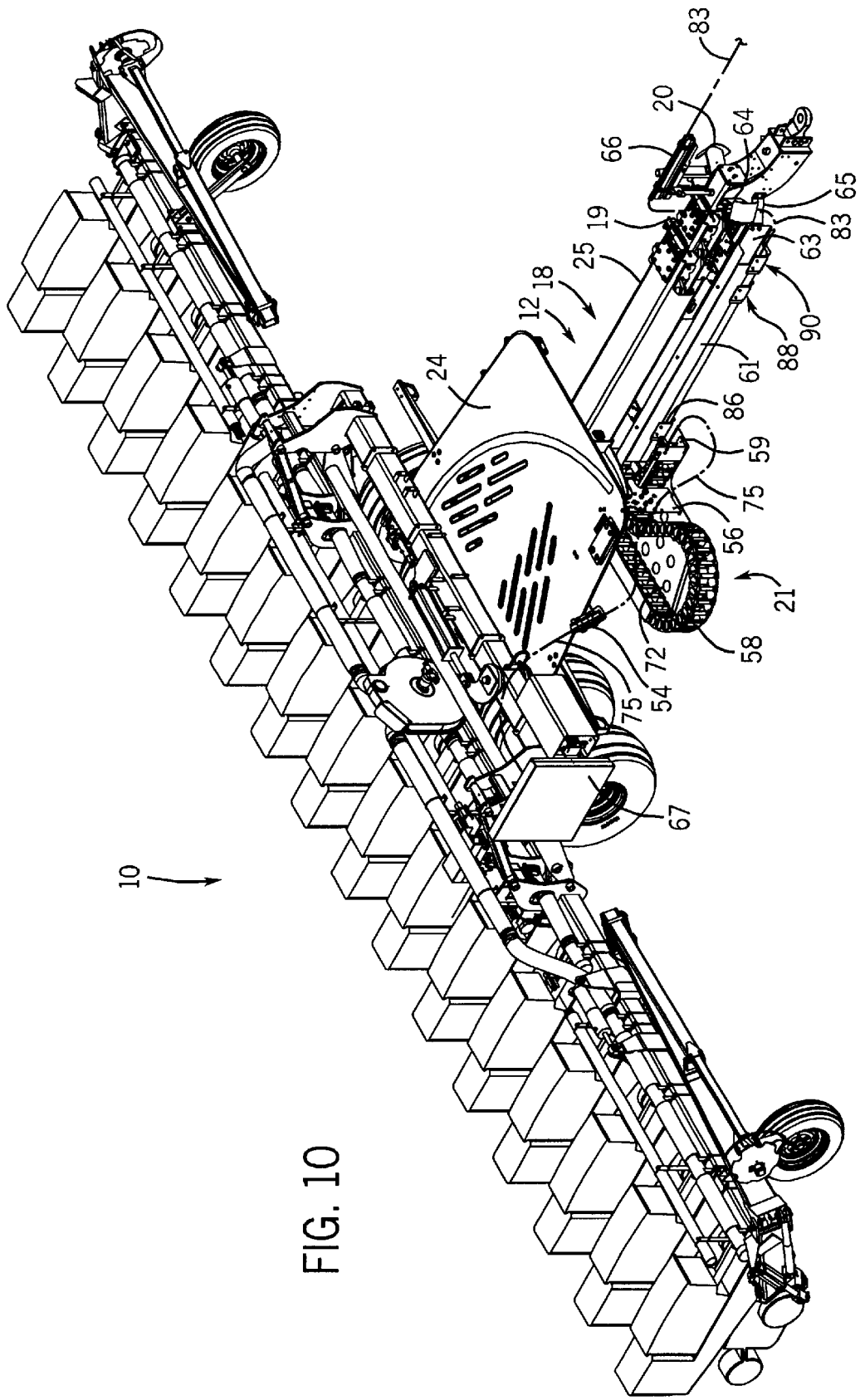
FIG. 10 is a perspective view of the power cable control system shown in the operation position of the agricultural apparatus.

Referring to FIGS. 8 and 9 and also to FIG. 4, in addition to the components described above, main seed hoppers 40 are shown secured to the main frame bar 14 via brackets 49 that mount to plate members 48. Hoppers 40 receive and store seed for delivery to mini-hoppers (not separately numbered) that form part of the row units 17. while not described here in detail it should suffice to say that a pneumatic seed delivery, system including a blower of some type and a network of seed delivery hoses links hoppers 40 to the mini-hoppers to automate seed delivery.

Referring still to FIGS. 1, 2, 3 and 5, carrier frame assembly 12 generally includes a cross bar 13, two wheel assemblies 30, a draw bar assembly 18 and platform 24. Each wheel assembly 30 includes an axle support member 32 and a pair of wheels 31 mounted on opposite sides of a corresponding support member 32. Cross bar 13 (see FIG. 3) is a steel elongated bar. A separate one of wheel assemblies 30 is mounted at each one of the cross bar 13 ends and extends downward therefrom so that assemblies 30 support cross bar 13 above ground.

A pivot pin 34 (see bottom end thereof in FIG. 8) is provided that extends upwardly from a top surface of bar 13. Pin 34 is formed about a vertical axis 11 and is formed so as to be receivable by the downwardly facing opening formed by pivot plate 28 (see FIG. 4) for rotation thereabout.

Figure 2:
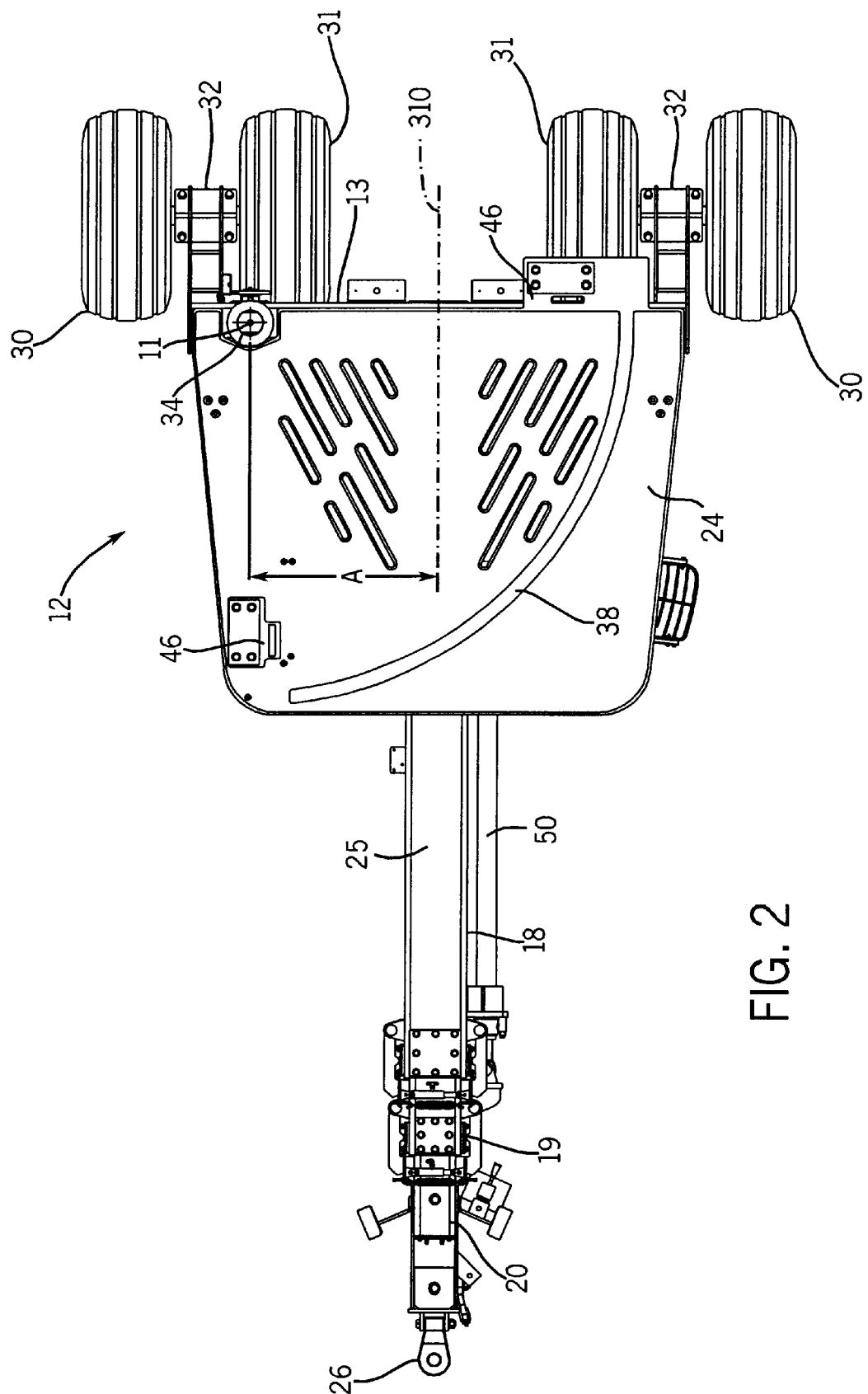
FIG. 2 is a top plan view of the carrier frame of illustrated in FIG. 1.
Figure 3:
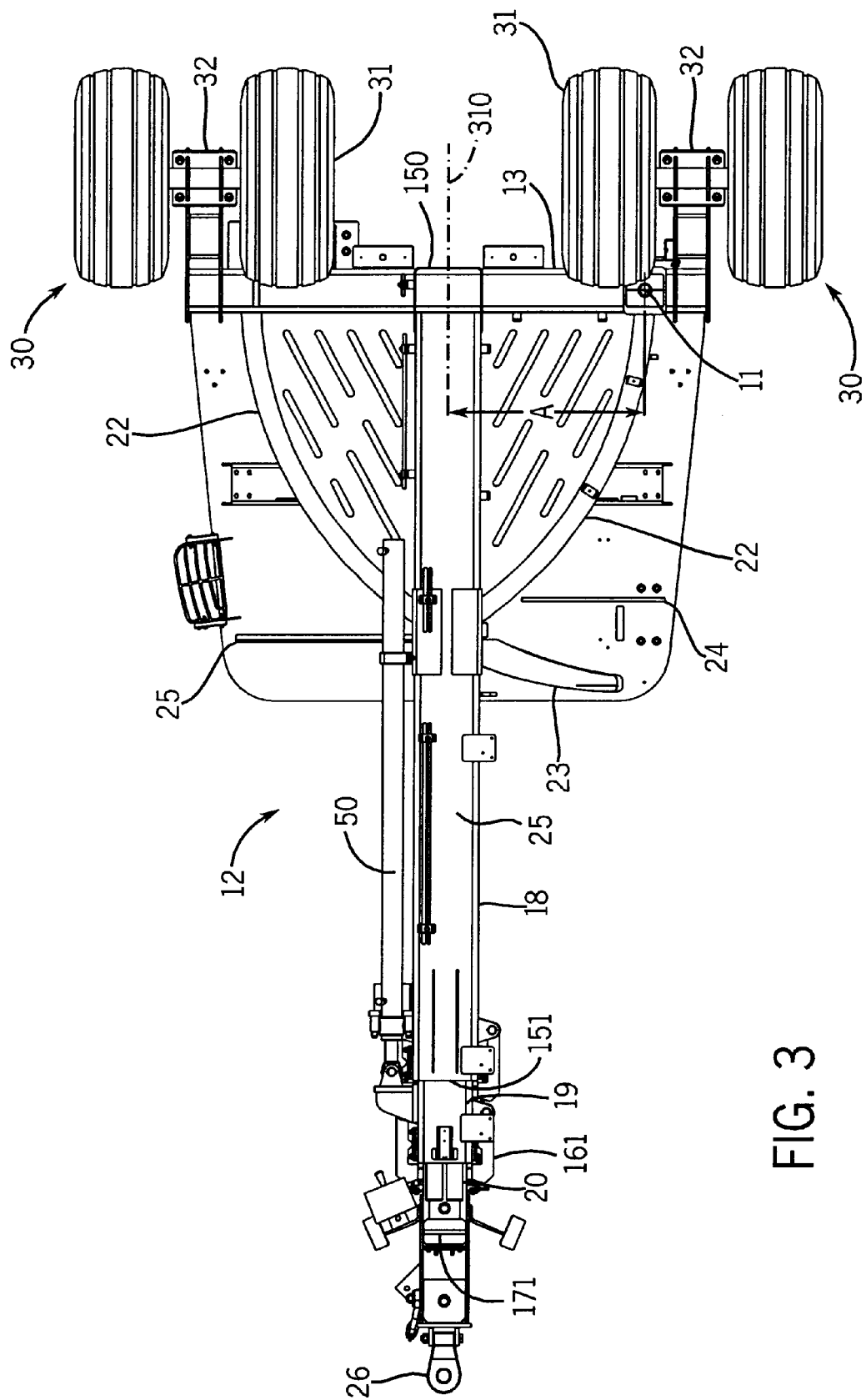
FIG. 3 is a bottom plan view of the carrier frame illustrated in FIG. 1.
Figure 11:
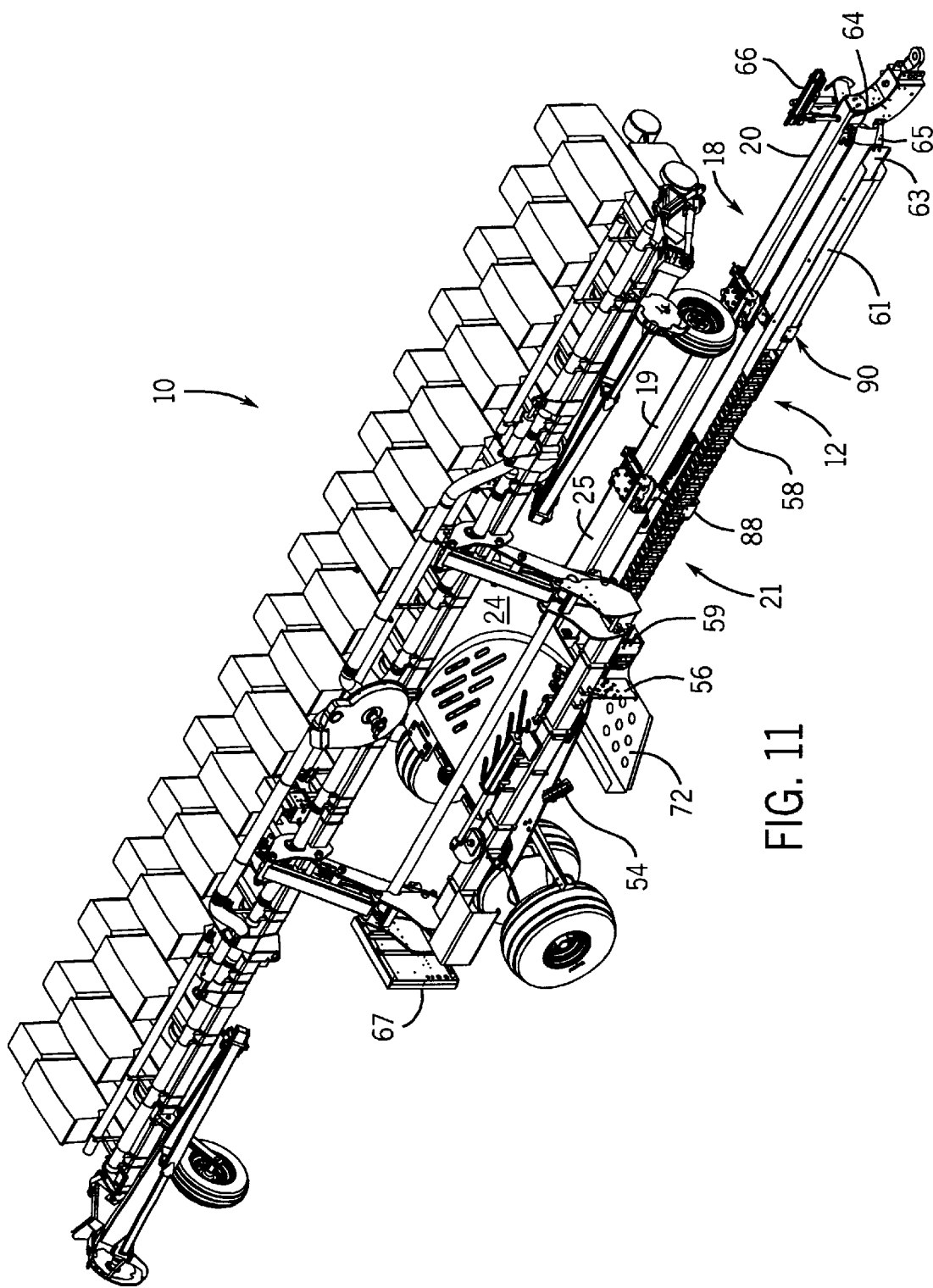
FIG. 11 is a perspective view of the power cable control system shown in the transportation position of the agricultural apparatus.

Referring to FIGS. 1, 2, 3, 7 and 9 draw bar assembly 18 is a two stage tongue assembly that is described in greater detail below. Suffice it to say at this time that, among other components, assembly 18 includes a first tongue member 25 having first and second ends 150 and 151 and forming a first passageway 152. First tongue member 25 also forms an external surface 154. As best seen in FIGS. 3 and 11, first tongue member 25 is secured at its first end 150 to a central point of cross bar 13 via welding or some other suitable securing process.

Referring to FIGS. 2, 3, 8, platform 24 is essentially a rigid flat bed member that is secured to a top surface of cross bar 13 and approximately half of first tongue member 25 proximate cross bar 13. Among other features, platform 24 forms a track runner 38 on a top surface which is reinforced on a platform undersurface (see FIG. 3) via supporting tracks 23 and 22 or in any other manner known in the art. Pivot pin 34 extends through an opening in platform 24. Referring also to FIG. 4, track runner 38 forms an arc about pivot pin 34 having a radius dimension that is identical to the space dimension between pivot plate 28 and roller assembly 44 on bar 14. Runner 38 is dimensioned so as to securely support the roller of assembly 44 in any position along the runner and thereby provide support to main frame bar 14 thereabove.

Referring still to FIGS. 2 and 4, transport and operating implement locking brackets or latches 46 are also provided on the top surface of platform 24. A transport bracket 46 is generally spaced from pivot pin 34 along a line parallel to the length of first tongue member 25 while an operating bracket 46 is generally spaced from pin 34 on the side of first tongue member 25 opposite pin 34. Each bracket 34 is formed so as to securely receive and lock to latch assembly 45 to lock the main frame assembly 69 and other components secured thereto to platform 24 in either the transport or operating positions.

Referring now to FIGS. 1, 2, 4 and 8, with carrier frame assembly 12 assembled and implement assembly 15 secured to the main frame assembly 69 as described above, the main frame bar 14 is positioned such that pin 34 is received in the opening formed by plate 28 and with the assembly 44 roller supported on runner 38. Gravity maintains main frame assembly 69 on runner 38 and some type of collar (not illustrated) on pin 34 may be provided to further ensure that assembly 69 remain secured. With wheels 35 and 36 and/or the implement assembly manipulated so that the wheels 35, 36 are off the ground, the entire main frame bar 14 and components attached thereto are moveable between the transport position illustrated in FIG. 9 to the operating position illustrated in FIG. 1 and to any intermediate position therebetween (see FIG. 7) by simply rotating main frame bar 14 about pivot pin 34. As indicated above, when in either the transport or operating positions, latch assembly 45 and one of brackets 46 cooperate to lock main frame bar 14 to carrier assembly 12 to eliminate relative movement during transport. Any means for rotating bar 14 about pin 34 may be employed. Similarly, any means for operating latch assembly 45 and for raising and lowering the implement assembly and/or the lateral support wheels 35, 36 may be employed.

Figure 7:
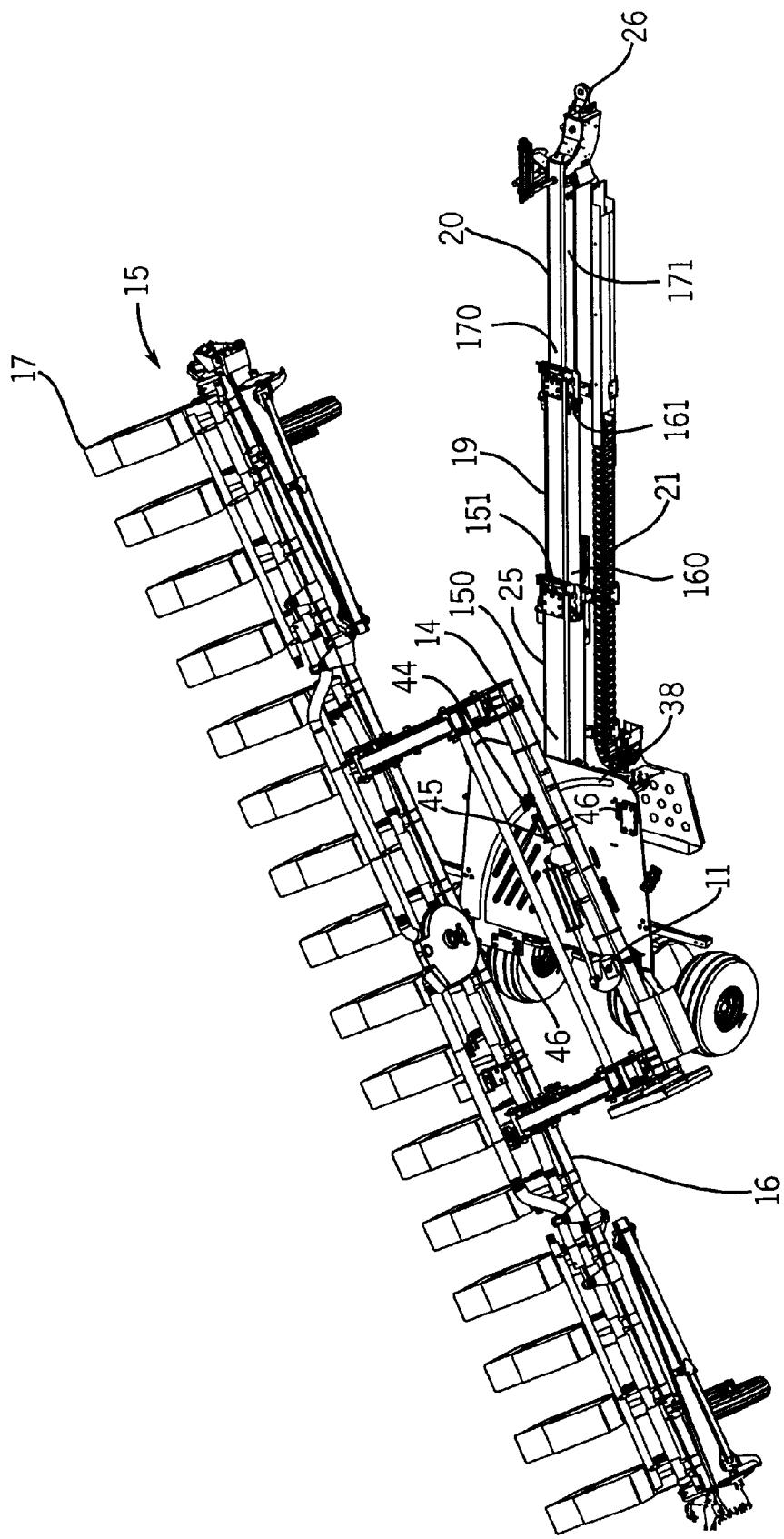
FIG. 7 is a perspective view of the embodiment of FIG. 1 in an intermediate position with an implement between the operating and the transport positions.

Referring again to FIG. 1 where the assembly is shown in the operating position, consistent with reducing the number of required headland passes needed to perform an agricultural task for an entire field, the cross bar assembly 18 is relatively short. Referring also to FIGS. 7 and 9, however, it can be seen that, in order to accommodate a long implement configuration in the transport position, the tongue assembly has to be extended.

Referring now to FIGS. 1, 2, 3, 7, 9, 11 and 21 an exemplary two stage tongue assembly according to the present invention includes the first tongue member 25 described above, second and third tongue members 19 and 20, respectively, a hitch assembly 26 and a first hydraulic tongue cylinder 50 and a second hydraulic tongue cylinder 52 (see FIG. 21).

Figure 16:
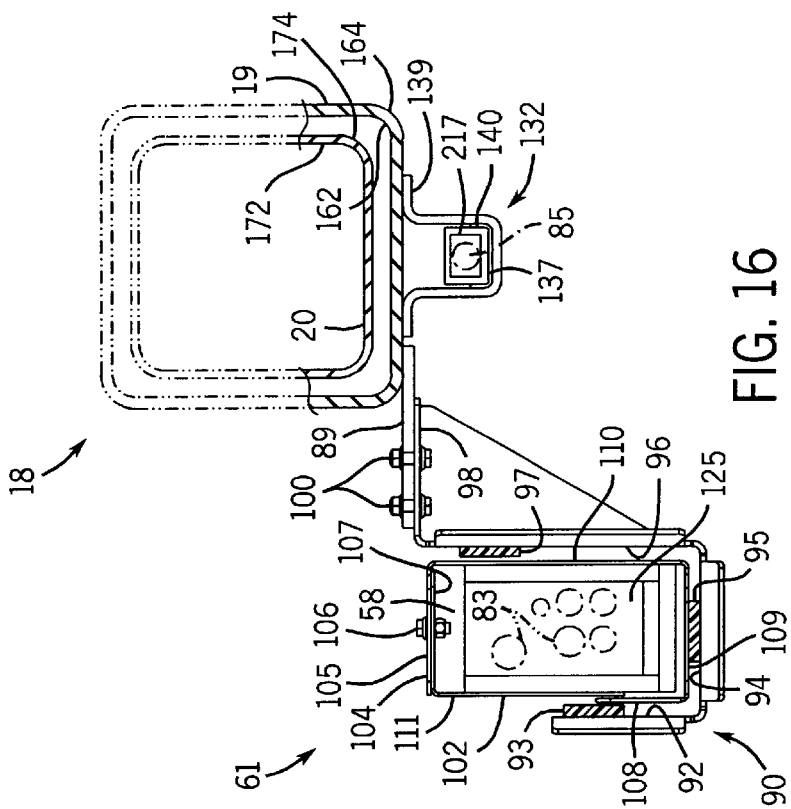
FIG. 16 is a detail cross-sectional view, of the power cable carriers and support guide assembly mounting to telescoping tongue, taken along lines 16—16 of FIG. 13.
Figure 17:
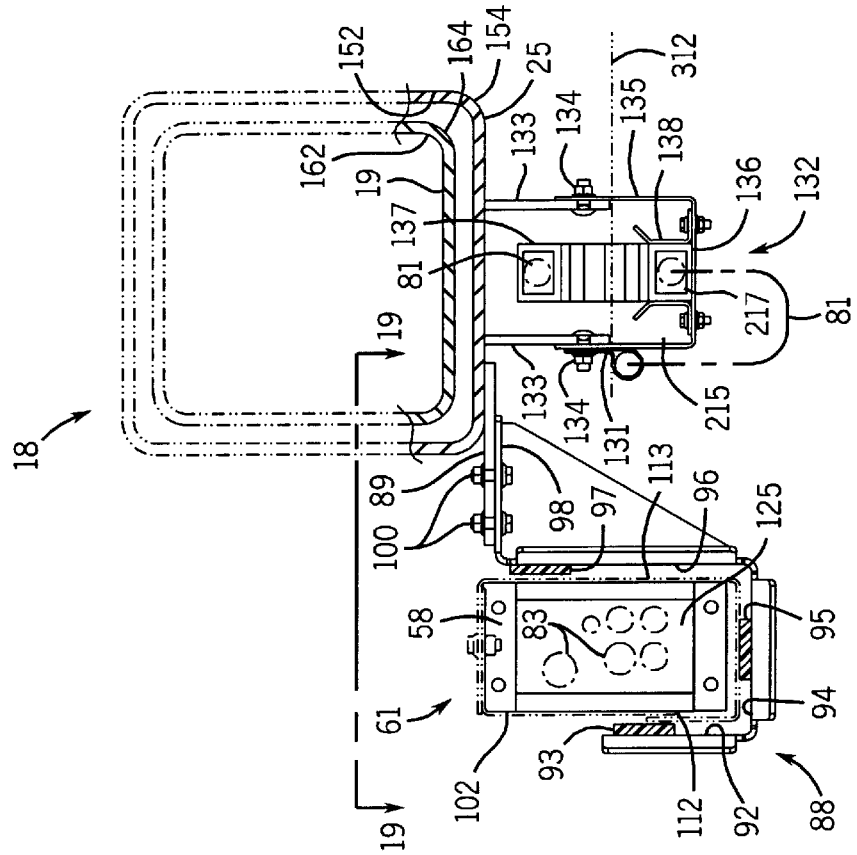
FIG. 17 is a detail cross-sectional view, of the power cable carriers and support guide assembly mounting to telescoping tongue, taken along lines 17—17 of FIG. 13.
Figure 18:
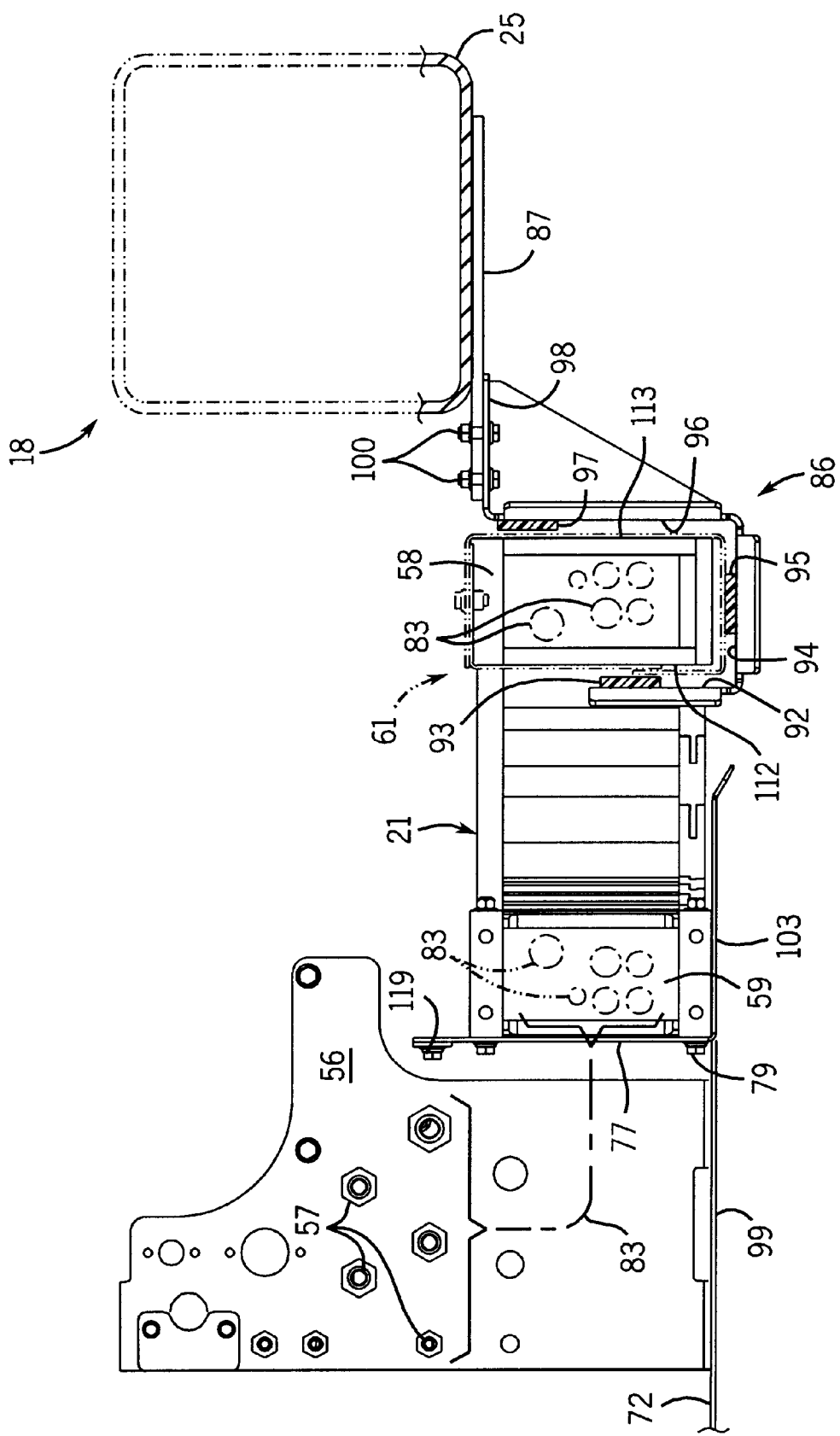
FIG. 18 is a detail cross-sectional view, of the power cable carriers and support guide assembly mounting to telescoping tongue, taken along lines 18—18 of FIG. 13.

Referring also to FIGS. 7, 16 and 17, as described above, first member 25 has first and second ends 150 and 151, an external surface 154, forms a first passageway 152 and is secured to a central point on cross bar 13. Second tongue member 19 has first and second ends 160 and 161, an external surface 164 and forms a second passageway 162 while third tongue member 20 has first and second ends 170 and 171, has an external surface 174 and forms a third passageway 172. Hitch assembly 26 is secured to the second end 171 of third tongue member 20. Attached to the two-stage tongue is a power cable control system 21 that retracts during implement operation and extends during transport and that is described in greater detail below. Referring to FIGS. 16 and 17, third tongue member 20 is dimensioned to be received within second passageway 162 with minimal clearance while second tongue member 19 is dimensioned to be received within first passageway 152.

Referring once again to FIGS. 1, 2, 3, 20 and 21, first cylinder 50 includes a rod 50a that extends therefrom to a distal end and is double acting meaning that the cylinder 50 is plumbed via cylinder ports 124 so that the rod 50a can be forced to either extend or retract. Similarly, second cylinder 52 includes a rod 52a having a distal end and that is double acting and includes ports 130. Second hydraulic cylinder 52 is generally mounted within the third passageway 172 formed by third tongue member 20. To this end, a cylinder mounting bracket 127 is secured to cylinder 52 and is mounted to the internal surface that forms passageway 172 adjacent an opening of member 20 at the first end 170 thereof. The distal end of rod 52a is mounted via a rod mounting bracket 129 to the first end 160 of second tongue member 19. It should be appreciated that when rod 52a is extended, third tongue member 20 is forced out the second end 161 of member 19 thereby extending the sub-assembly including members 19 and 20.

Referring now to FIGS. 1, 2, 3, 20 and 21, first cylinder 50 is generally mounted to the external surface 154 of first tongue member 25 via a bracket 121 proximate the second end 151 of member 25 so that the distal end of rod 50a extends past second end 151. The distal end of rod 50a is secured proximate the second end 161 of second tongue member 19 via a cylinder rod mounting bracket 123. Thus, it should be appreciated that when rod 50a is extended, cylinder 50 forces second tongue member 19 from within first tongue member 25 thereby extending the subassembly including members 19 and 25.

More detail regarding an exemplary multi-stage tongue assembly that may be used with the present invention is described in the related reference identified above and entitled "Planter Hitch Apparatus".

The power cable system that is used to provide power (e.g., hydraulic fluid, electrical power, etc.) to assembly 10 will now be described. To this end, referring to FIGS. 10 through 21, generally, the power cable system includes a source control unit 68 that resides on a tractor or other type of prime mover, the power cable sub-assembly 21, a tongue cable sub-assembly 132, a platform bulkhead 56, a planter control bulkhead 67 and various cables of different types. Control unit 68 includes source ports (not separately illustrated) proximate a hitch receiving member on the rear end of a. prime mover that provide various power types to the assembly 10. For instance, several of the ports may provide hydraulic fluid and be linkable to suitable hoses while other ports may provide electrical power via power cables.

Bulk head 56 includes a plate member mounted to the underside of platform 24 so that a substantially flat and vertical surface is proximate a front edge of platform 24 and faces in a transport direction (i.e., the direction in which the assembly 10 moves during forward transport). Head 56 forms a plurality of receiving ports (some of which are collectively identified by numeral 57—see FIGS. 12 and 18), each port 57 configured to receive a specific type of power cable. As seen in FIG. 14, each port 57 extends through head 56 and out a rear surface of head 56 and is linkable to another cable of a type similar to the cable that linked to the front of the port.

Planter control bulkhead 67 is similar to head 56 in that head 67 includes a plurality of two end cable ports (not separately illustrated) that are linkable to separate power cables of different types.

Figure 13:
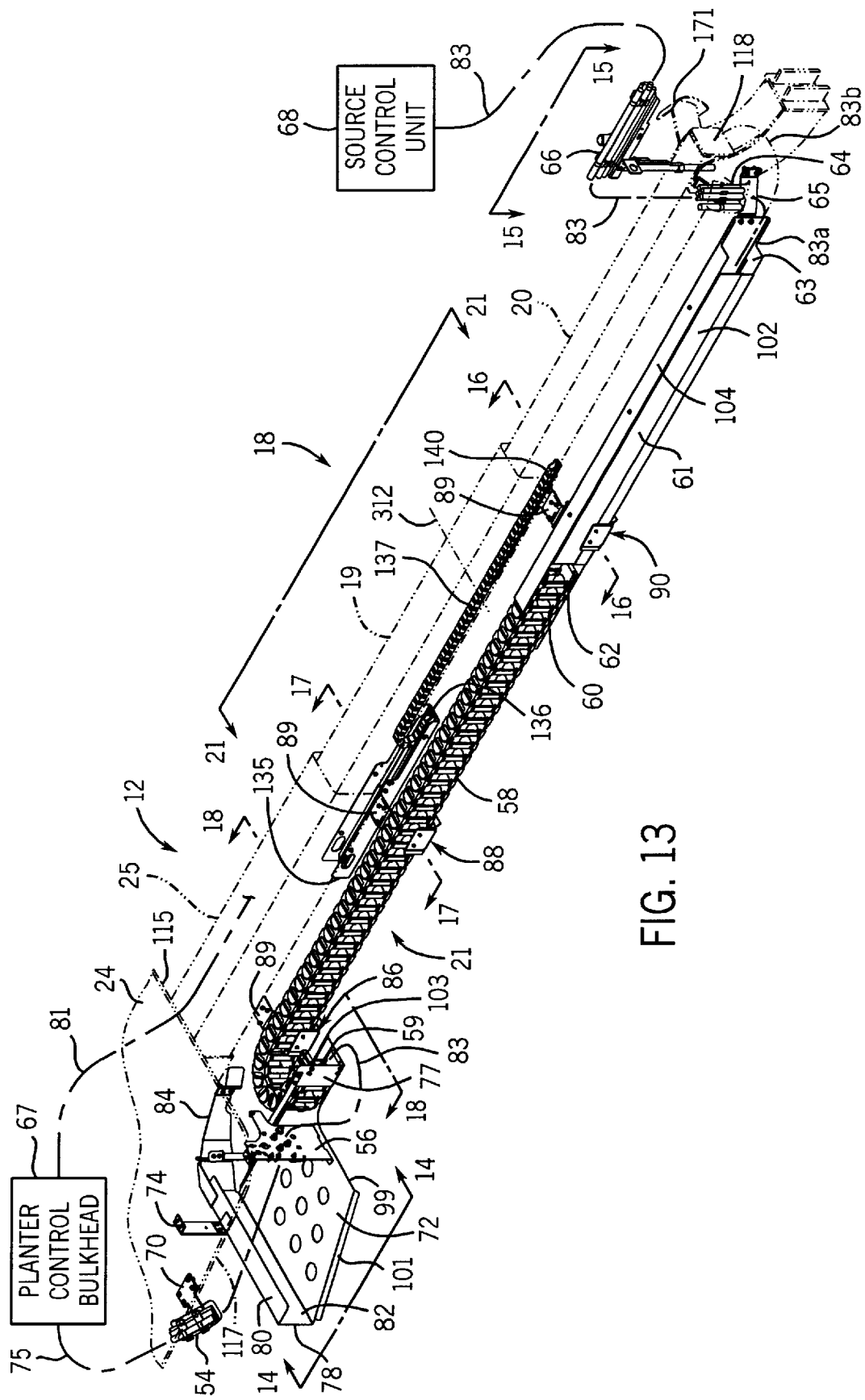
FIG. 13 is a detail perspective view of the power cable control system in the extended position with the telescoping tongue shown in phantom.

Referring to FIGS. 13, 20 and 21 cables 83a link control unit 68 ports to bulkhead 56 ports and cables 75 link head 56 ports to planter head 67 ports. In addition, cables 83*b* link bulkhead 56 to the second end 171 of third tongue member 20 via a port 118 which leads to cylinder ports 130 on internal cylinder 52 (see FIG. 21). Exemplary cables 81 are hydraulic hoses linking bulkhead 67 to the cylinder ports 124 of cylinder 50. Cables 81 are indicative of cables linking planter head ports to assembly devices requiring power (e.g., hydraulic or electrical) and it should be understood that many other cables 81 in addition to the exemplary cables illustrated are contemplated.

Several cable clamps and holders are provided that hold and clamp corresponding cable sections securely and stationary with respect to other assembly components. For instance, a hose holder 66 is mounted to the top of the second end of tongue member 20 for receiving and essentially bundling cables that are linked to the control unit 68. Similarly, a cable clamp 64 is mounted to the second end 171 of member 20 and is provided to receive cables from holder 66 and orient the cables in a substantially bundled fashion proximate a lateral side of member 20. Yet one other holder, a platform cable holder 54 is provided that is mounted to a side edge of platform 24 on the same side of platform 24 as holder 64. Holder 54 receives cables from bulkhead 56 and orients the received cables with respect to bulkhead 67.

Referring still to FIGS. 10 through 21, cable assembly 21 generally includes a guide member or carrier trough 61, a receiver assembly or cable carrier tray 72, a deflector assembly including walls 78, 80 and 84, a cable sheath member or reel 58 and a plurality of brackets 74, 76 (see FIG. 14), 86, 88, 90 and 65. Referring specifically to FIGS. 13 and 16, trough 61 includes a main trough member 104 and a closure member 102. Main member 104 includes oppositely facing top and bottom wall members 105 and 109, respectively, and facing first and second lateral wall members 108 and 110, respectively. Second lateral wall member 110 traverses the distance between adjacent edges of top and bottom members 105 and 109, respectively, and is perpendicular to each of those wall members.

First lateral wall member 108 extends upward from an edge of bottom wall member 109 opposite wall 110 and extends approximately half way toward top wall member 105. Wall members 105, 108, 109 and 110 are elongated and hence define a trough or passageway therebetween that is open at each of fixed and moveable ends 62 and 63. Closure member 102 includes a top wall 107 and a single lateral wall 111 that extends substantially perpendicular from an edge thereof. Walls 107 and 111, like the trough walls (e.g., 105) are elongated and member 102 is open at its ends. Each of top wall 105 and top wall 107 form apertures (not separately illustrated or numbered) that align when wall 107 is received against the underside of wall 105 with wall 111 closing the space between walls 109 and 105 as illustrated in FIG. 16. A plurality of nuts and bolts 106 are provided to secure walls 105 and 107 together via the aligned holes. As seen in FIGS. 15 and 16 bracket 65 secures trough end 63 to the second and distal end of third tongue member 20 (e.g., to end 171) such that trough 61 extends back and substantially parallel to a lateral side of third tongue member 20 in a direction substantially parallel to the direction in which the tongue assembly 18 telescopes. Hereinafter the telescoping direction will be referred to generally as a transport direction.

Each of brackets 86, 88 and 90 are of similar construction and operate in a similar fashion and therefore, in the interest of simplifying this explanation, only bracket 88 will be described in detail. Bracket 88 includes first and second oppositely facing lateral walls 92 and 96 and a bottom wall 94 that traverses the distance between walls 92 and 96 and an extending and braced wall 98 that extends laterally from a top edge of wall 96 in a direction opposite wall 94. Walls 92, 94 and 96 define a trough receiving space therebetween that is upwardly open. Bearing pads 93, 95 and 97 are secured to the internal surfaces of walls 92, 94 and 96, respectively, with pads 93 and 97 defining a space that is slightly greater than the dimension between the external surfaces of trough wall members 108 and 110 so that trough 61 is receivable therebetween. As best seen in FIGS. 13 and 17, a bracket receiver 89 is welded to the distal end 161 of second tongue member 19 and lateral wall 98 is bolted thereto via nut and bolt combinations 100 so that wall 96 extends vertically downward therefrom. Components of bracket 90 in FIG. 16 are earmarked in a fashion similar to that described above and illustrated in FIG. 17. Referring to FIG. 19, each of pads 93, 95 (not illustrated) and 97 is tapered at its edges that extend perpendicular to the length of reel 58 passing therethrough to help guide reel 58 during relative motion. Brackets 90 and 65 are juxtaposed such that the underside of trough wall member 109 rests on lower bearing pad 95 as illustrated.

Referring still to FIG. 13, bracket 74 extends vertically downward from the underside of platform 24 to wall 78 to secure wall 78 in a rigid fashion. Wall 78 is forms a substantially vertical surface facing in the transport direction that is substantially perpendicular to the transport direction and hence perpendicular to the length of tongue assembly 18. Wall 78 is open at a distal end 82 that is laterally furthest from bracket 74. A top wall 80 is mounted to the top edge of wall 78 and extends perpendicular thereto along the entire length thereof in the transport direction.

A deflection member 84 is mounted to the proximate end of wall 78 (i.e., to the end opposite end 82). Member 84 is a rigid curved member having a first end substantially aligned with wall member 110 of trough 61 (see FIGS. 13 and 16) and a second end that is substantially aligned with wall 78 such that member 84 is generally concave therebetween. Thus, beginning at the first end of member 84 and facing opposite the transport direction member 84 curves toward the lateral direction defined by the surface of wall 78.

Carrier tray 72 is a substantially flat member that is mounted to the bottom edge of wall 78 and extends perpendicular thereto and in the transport direction therefrom and, among other edges, forms a lateral edge 101 facing away from assembly 18 and a front edge 99 facing in the transport direction. Tray 72 is dimensioned such that front edge 99 is proximate and below a front edge 115 of platform 24 (see FIGS. 5 and 13) and so that lateral edge 101 extends laterally further (e.g., 1 foot) that a lateral edge 117 of platform 24 thereabove. Tray 72 also forms an extending portion 103 that extends further in the transport direction than the front edge 99 to support an open stationary end of reel 58 as described in greater detail below.

Figure 12:
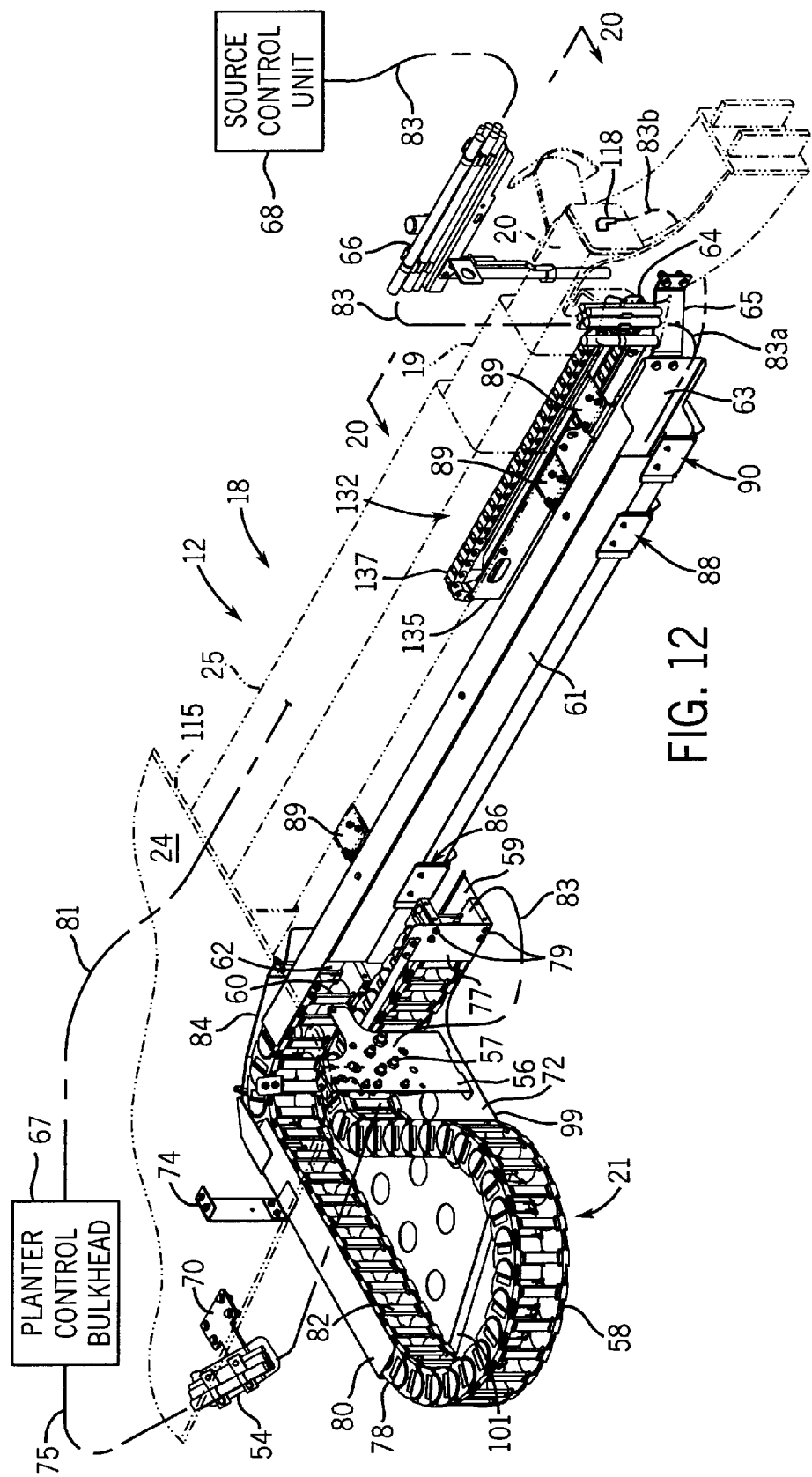
FIG. 12 is a detail perspective view of the power cable control system in the retracted position with the telescoping tongue shown in phantom.

Referring to FIG. 14, a center mounting bracket 76 extends downward from the underside of carrier platform 24 to a central point on tray 72 to provide support thereto and to provide a member about which reel 58 can pivot or rotate during movement into a stowed position (see FIG. 12). A bottom edge of bulkhead 56 is mounted proximate the front edge 71 of tray 72 providing additional support to tray 72. An extending portion of tray 72 identified by numeral 1-3 extends in the transport direction past the edge of platform 24. A cable mounting bracket 77 extends upwardly from extending portion 103 and is fitted to securely receive a stationary and open end of reel 56. A substantially horizontal and rigid tie member 119 is mounted between the upper end of bracket 77 and a central point on bracket 76 to provide support to bracket 77. Thus, it should be appreciated that members 72, 78 and 80 together form a receiving space for receiving and supporting reel 58 when reel 58 is in a stowed position as illustrated in FIG. 12.

Hereinafter the phrase stationary tongue member will be used to refer to member 25 that is stationary with respect to platform 24 and the phase extendable member will be used to refer to either of members 19 or 20 that are extendable during tongue operation. Similarly, the phrase stationary port will be used to refer to an end of a cable that is stationary with respect to stationary member 25 while the phrase moveable port wilt be used to refer to a cable end or segment that is moveable along with one of the extendable tongue members (e.g., 19, 20) during tongue operation. Other components that are stationary with respect to member 25 and that move with one of the extendable tongue members will be similarly referred to.

Referring now to FIGS. 12 and 13, reel 58 is generally a flexible chain type reel assembly including separate rigid chain link members that each form a central opening and each include components that cooperate with adjacent chain link components to limit the angular positions of adjacent chain link members. When the links are attached to form reel 58, the central openings in adjacent link components are generally aligned to form a reel passageway 125 that extends the entire length of reel 58 and that opens at opposite reel ends 59 and 60. End 59 is a stationary end and is rigidly mounted to bracket 77 so that end 59 opens in the transport direction, is supported by extending portion 103 and is fixed with respect to components adjacent thereto. End 60 is a moveable end and is mounted to end 62 of trough assembly 61 so that the passageway formed by trough 61 opens into open end 60, is generally aligned therewith and is movable with respect to adjacent components.

While the guide members and brackets generally work well to restrict reel movement and bending and to guide the reel between a stored position illustrated in FIG. 12 and an extended position illustrated in FIG. 13, in at least one embodiment the links used to construct reel 58 are specially limiting and their construction depends on where within the reel length the links reside. As an initial matter it should be appreciated that at least in the illustrated embodiment reel 58 is mechanically restricted so that when reel 58 is mounted for use, reel 58 has little if any vertical bend and essentially all bending occurs within a single vertical plane. This restriction helps to ensure that reel 58 does not droop below a desired height and hence reduces the likelihood of reel 58 becoming snagged on other assembly components or items that stick up from the ground below.

In addition, as seen in FIGS. 12 and 13 several of the links bend in both directions with respect to adjacent links and other links only have to be able to bend in a single direction with respect to adjacent links. For instance, referring to FIGS. 12 and 13, the links proximate end 59 that form the bend proximate end 59 have to be able to bend in a first direction with respect to adjacent links to enable reel 58 to assume the illustrated configuration when the reel is in the stored position (see FIG. 12) and have to be able to bend in a second direction opposite the first direction with respect to adjacent links to enable reel 58 to assume the illustrated configuration when the reel is in the extended position (see FIG. 13). As another instance, in the illustrated embodiment all of the other links (i.e., the links that are not proximate end 59 need only pivot to one side of adjacent links (i.e., observing reel 58 from a top plan view these links have to pivot to the right of adjacent links).

More specifically, referring to FIG. 19, among others, three separate links 210, 211 and 212 are illustrated in a top plan view where each link pivots about a substantially vertical axis 200, 201 and 202, respectively, with respect to an adjacent link and where three adjacent vertical axis 200, 201 and 202 form a plane 221 when the links are aligned along the length of reel 58 to form a substantially straight passageway 125 (see FIG. 16) therethrough. As illustrated, each of links 210 and 211 are mechanically configured so that they pivot to either side of plane 221. Link 212 is different than links 210 and 211 in that link 212 includes a stop member 250 that contacts an adjacent surface formed by link 211 that restricts rotation of link 212 with respect to 211 to a single side of plane 221. Other restricting configurations are contemplated.

Referring also to FIG. 12, the links proximate stationary end 59 are constructed in a fashion similar to link 210 while the other links are constructed in a fashion similar to that of link 212. For instance, the ten links at end 59 may each be dual rotating (i.e., able to rotate to either side of an adjacent link) while all other links may be single rotating (I.e., able to rotate to only a single side of an adjacent link).

As indicated above opposite ends 59 and 60 of reel 58 are mounted to bracket 77 and trough end 62 and each end 59 and 60 faces in the transport direction such that a curve is formed by reel 58 that has a convex surface that faces the curved deflection surface of deflector 84 and that faces into the receiving space 82 defined by members 72, 78 and 80. The mid-section of reel 58 is supported by tray 72 and, at times, some combination of brackets 86 and 88. For instance, when in the stored position illustrated in FIG. 12, tray 72 essentially independently supports reel 72 while, when in the extended position illustrated in FIG. 13, tray 72 and brackets 86 and 88 together support reel 72.

Reel 58 has a length that, when combined with the length of trough 61, extends the length of assembly 18 when assembly 18 is in its extended position. Cables 83a that are linked to the source ports on the tractor (not illustrated) and similar cables 83b and that extend from the bottom of clamp 64 are directed into trough end 63 and extend from end 62 into reel end 60, extend through reel 58 and out end 59 facing in the transport direction. From end 59 cables 83 loop back 180 degrees and are secured to appropriate receiving ports 57 on bulkhead 56. Cables 75 extend from the other side of bulkhead 56 to various devices and other bulkheads that require power.

In operation, with assembly 10 configured as indicated above and assuming that tongue assembly 18 is in the retracted position illustrated in FIG. 12, the cables within reel 58 passageway 125 assume a configuration similar to that of reel 58 and are stored in a protected fashion under platform 24 with reel 58 supported on tray 72. In this position trough 61 is supported by each of brackets 86, 88 and 90.

When assembly 18 is extended as illustrated in FIG. 13, trough 61 that is rigidly secured at end 63 to the distal or second end 171 of third tongue member 20 is pulled in the transport direction and drags reel end 60 there along. During an extending process, reel 58 is guided out of the space above tray 72 and, during extension, is supported first by bracket 86 and then by bracket 88. Bracket 76 operates to help guide reel 58 from tray 72 by, at least in part aligning reel 58 with the trough end 62. Eventually, when assembly 18 is fully extended, reel 58 is likewise essentially fully extended and supports and protects cables 83 therein.

When assembly 18 is retracted from the position of FIG. 13 to the position of FIG. 12, as assembly 18 retracts, trough 61 forces reel end 60 toward deflector member 84 and the segment of reel 58 adjacent segment 84 is forced toward segment 84. When reel 58 contacts member 84, member 84 deflects reel 58 toward and along member 78 and onto tray 72. As reel 58 is forced onto tray 72, eventually reel 58 forms two bends including a large bend that extends off lateral tray edge 101 and a smaller radius bend around bracket 76 and that leads to end 59.

Thus, it should be appreciated that the power cable sub-assembly 21 described above generally protects power cables within reel 58 and trough 61 that have to move with respect to other assembly 18 components to, in effect, provide a variable length power cable assembly. It should be appreciated that the relative positions of sub-assembly 21 components illustrated render the system particularly serviceable. To this end, by having the stationary open end 59 of reel 58 and bulkhead 56 facing forward or in the transport direction (see FIG. 12) and juxtaposed proximate the front edge 99 of tray 72 (and hence just below the front edge 115 of platform 24), a system operator or maintainer can easily access the cables 83 to perform hookups and maintenance. Moreover, by directing reel 58 laterally onto tray 72, there is plenty of space behind the stored reel 58 to mount a coulter apparatus or any other required system components.

Referring now to FIGS. 12, 13, 16, 17 and 21, the tongue cable sub-assembly 132 includes a receiver assembly also referred to as a tongue reel tray 135, a tongue reel support bracket 139, a sheath member also referred to as a tongue reel 137 and various other components. Tray 135 includes a bottom wall and two opposing lateral walls that extend up from opposite edges of the bottom wall such that the walls together define a space therebetween. Referring specifically to FIGS. 17 and 21, tray 135 is mounted to the underside of first tongue member 25 via facing brackets 133 and bolt-nut assemblies 134 and extends past the end 151 thereof such that the underside of tongue member 25 forms a guide member that restricts.vertical bending of reel 137 during operation. Two tongue reel guides 138 extend upward from the internal and upwardly facing surface of the bottom wall of tray 135 and diverge upwardly in opposite directions. Thus, the undersurface of member 25 and tray 135 together form a tray passageway 215 that extends partway along the bottom of member 25 and past edge 151.

Bracket 139 is mounted to the underside of second tongue member 19 at distal or second end 161 thereof and is sized to receive and securely mount a moveable open end of reel 137.

Reel 137 is similar to reel 58 in construction including a plurality of chain link members that each form an opening and that are linked together so that their openings form a passageway 217 (see FIGS. 16 and 17). The links that make up reel 137 are of the single rotating type meaning that each of the links is configured such that links attached thereto can only rotate or pivot to one side thereof. Reel 58 has opposite open ends 136 and 140 that are mounted to the distal end of tray 135 and the second end 161 of second tongue member 19 with both ends 136 and 140 facing in the transport direction and end 140 above end 136 such that adjacent links in reel 137 rotate about substantially horizontal axis (one identified via numeral 312 in FIGS. 13 and 17). Thus, end 136 is a stationary end and end 140 is a moveable end. Reel 58 has a length that extends from the distal end of tray 135 to second tongue end 19 while accommodating a single 180 degree bend (see FIG. 21).

Referring still to FIGS. 16, 17 and 21, hydraulic hoses 81 from control bulkhead 67 are routed to and into open reel end 136, through reel 137 and out end 140 to a tongue locking assembly 260 at the second end 161 of second tongue member 19. Hose hangers (e.g., 131—see FIG. 17) may be provided to secure hoses to adjacent non-moving components. Assembly 260 is illustrated as a block as the details regarding how assembly 260 operates are unimportant for the purposes of the present invention. It should suffice to say that assembly 260 requires hydraulic fluid to operate and, as indicated in FIGS. 20 and 21, moves along with end 161.

In operation, assuming assembly 18 is initially in its retracted configuration illustrated in FIG. 12 and reel 137 is in its stowed position illustrated in FIG. 20, when member 20 is extended from member 19, reel 137 is pulled from tray 135 as illustrated in FIG. 21 and assumes an extended position to provide power to locking assembly 260. During opposite movement when member 20 is retracted back into member 19, reel 137 end 140 is forced back toward tray 137 and accumulates thereon in the stowed position. Thus, reel 137, like reel 58, provides protection for cables there inside and also provides a variable length cable assembly.

While the drawings, specific examples, and particular formations given describe exemplary embodiments, they serve the purpose of illustration only. The materials and configurations shown and described may differ depending on the chosen performance characteristics and physical characteristics of the planter equipment. For example, the type of planter equipment may differ. In addition, while a two stage configuration is illustrated, configurations including many more stages are contemplated where externally mounted cylinders are disposed on the various sides of the tongue assembly. Moreover, an embodiment where all cylinders are externally disposed is contemplated.

In addition, embodiments including only a single reel (e.g., 137, 58) are contemplated and systems that include other types of cable sheaths with other flexing properties are contemplated. Moreover, while the tray formed by members 72, 78, etc. is illustrated as being mounted adjacent the stationary end of reel 58, other embodiments are contemplated where the tray is formed proximate the moveable end of reel 58 and where the guide member or trough forces the reel onto the tray proximate the moveable end. Furthermore, in some embodiments reel 58 may be arranged such that associated links rotate about substantially horizontal axis. In addition, while advantageous, it is not necessary that each of the ends of reel 58 face in the transport direction. Thus, the systems shown and described are not limited to the precise details and conditions disclosed. Furthermore, other substitutions, modifications, changes, and omissions may be made in the design, operating conditions, and arrangement of the exemplary embodiments without departing from the spirit of the invention as expressed in the appended claims.

What is claimed is:

1. An apparatus for use with a carrier assembly including a wheel supported carrier member and a tongue assembly including a stationary member mounted to the carrier member and an extendable tongue member receivable within and extendable to a substantially fully extended position from the stationary member along a transport axis, a stationary port fixedly mounted with respect to the stationary member and a moveable port fixedly mounted to the extendable member such that the distance between the ports depends on the degree of extendable member extension, the apparatus for linking the ports and comprising:

a receiver assembly mounted to the carrier assembly and including at least a first wall member forming a substantially upwardly facing surface below a receiving space and adjacent a first of the stationary and moveable ports and a corresponding first of the stationary and extendable members;

a flexible power cable having stationary and moveable cable ends secured to the stationary and moveable ports, respectively, with the tongue assembly in the fully extended position, the cable forming at least one curve having a convex surface that faces into the receiving space proximate a first of the cable ends; and a guide member mounted to the tongue assembly and substantially restricting cable bending between the curve and a second of the cable ends.

2. The apparatus of claim 1 further including a protective sheath member that forms a passageway having first and second ends proximate the stationary and moveable ports, respectively, and, wherein the cable is juxtaposed within the passageway.

3. The apparatus of claim 2 wherein the sheath member substantially restricts vertical bending of the cable.

4. The apparatus of claim 3 wherein the sheath member includes a plurality of chain link members that define the passageway where link members rotate about substantially vertical axis with respect to adjacent link members.

5. The apparatus of claim 4 wherein three adjacent vertical axis are substantially in a single plane when a corresponding link member pair is aligned and, wherein at least a first subset of link member pairs includes first and second link members where first member rotation with respect to the second member is restricted to one side of the single plane.

6. The apparatus of claim 5 wherein at least a second subset of link member pairs includes first and second link members where the first member is free to rotate with respect to the second member to both sides of the single plane.

7. The apparatus of claim 2 wherein the stationary port and stationary member are the first port and first member, respectively.

8. The apparatus of claim 7 further including a deflector member mounted to the carrier assembly and forming a deflection surface having first and second ends proximate the stationary tongue member and the receiver member, respectively, the first end aligned with the transport axis and the deflection surface at least in part sloping toward the receiving space.

9. The apparatus of claim 8 wherein the deflection surface forms a curve from the stationary tongue member to the second end of the deflection surface that is substantially perpendicular to the transport axis.

10. The apparatus of claim 9 wherein the receiver assembly further includes a substantially vertical second wall member that extends up from the first wall member and extends from the second end of the deflection surface along the length of the receiving space where the receiving space is on the same side of the second wall member as the tongue assembly.

11. The apparatus of claim 10 wherein the extendable member extends in a transport direction, each of the first and second sheath member ends are open in the transport direction and the curve is convex in a direction opposite the transport direction.

12. The apparatus of claim 11 wherein the carrier assembly includes a carrier platform having a front edge that faces substantially in the transport direction, the sheath member is mounted below the carrier platform and the first end of the sheath member is mounted below the front edge.

13. The apparatus of claim 12 further including a bulkhead including the stationary port where the bulkhead is mounted below the front edge and adjacent the first end of the sheath member.

14. The apparatus of claim 11 wherein the portion of the sheath member between the first and second sheath member ends passes between the second end of the sheath member and the stationary tongue member and wherein the curve convexly faces the deflection surface.

15. The apparatus of claim 14 wherein the sheath member includes a plurality of chain link members that define the passageway where link members rotate about substantially vertical axis with respect to adjacent link members.

16. The apparatus of claim 15 wherein the chain link members proximate the first end of the sheath member are free to rotate to either side of an adjacent link member and all other link members are restricted to rotate to a single side of adjacent link members that is consistent with the cable curve.

17. The apparatus of claim 8 wherein the extendable member includes a distal end forming a hitch and wherein the guide member includes an elongated rigid trough member mounted to the distal end that extends along a lateral side of the moveable tongue member toward the deflection surface.

18. The apparatus of claim 17 wherein the trough member is a trough housing that forms a trough passageway that extends parallel to the extendable tongue member and that opens into the sheath member passageway.

19. The apparatus of claim 17 further including support members that extend laterally from the tongue members and below the trough member to support the trough member thereabove.

20. The apparatus of claim 19 wherein the support members include a first support member at a distal end of the stationary tongue member and a second support member at the distal end of the extendable tongue member.

21. The apparatus of claim 1 wherein the extendable tongue member is a first extendable tongue member and the tongue assembly further includes a second extendable tongue member telescopically received within the stationary tongue member and that receives the first extendable tongue member.

22. The apparatus of claim 2 wherein the power cable includes a plurality of power cables positioned within the passageway.

23. The apparatus of claim 22 wherein the chain link members are restricted such that each link member rotates to only one side of an adjacent link member that is consistent with the convex curve.

24. The apparatus of claim 22 wherein the portion of the sheath member between the first and second sheath member ends passes between the second end of the sheath member and the stationary tongue member.

25. The apparatus of claim 2 wherein the sheath member includes a plurality of chain link members that define the passageway where link members rotate about substantially horizontal axis with respect to adjacent link members.

26. The apparatus of claims 25 wherein the receiver member and the sheath member are positioned below the tongue assembly.

27. An apparatus for use with an agricultural assembly and for providing a variable length drawbar for a carrier assembly including a wheel supported carrier member, the apparatus comprising:

a tongue assembly including a stationary member mounted to the carrier member and an extendable tongue member receivable within and extendable to a substantially fully extended position from the stationary member along a transport axis, a stationary port fixedly mounted with respect to the stationary member and a moveable port fixedly mounted to the extendable member such that the distance between the ports depends on the degree of extendable member extension;

a receiver assembly mounted to the carrier assembly and including at least a first wall member forming a substantially upwardly facing surface below a receiving space and adjacent the stationary port and the corresponding stationary member;

a flexible power cable having stationary and moveable cable ends secured to the stationary and moveable ports, respectively, with the tongue assembly in the fully extended position, the cable forming at least one curve having a convex surface that faces into the receiving space proximate the stationary cable end; and a guide member mounted to the tongue assembly and substantially restricting cable bending between the curve and a second of the cable ends.

28. The apparatus of claim 27 further including a protective sheath member that forms a passageway having first and second ends proximate the stationary and moveable ports, respectively, and, wherein the cable is juxtaposed within the passageway, the sheath member including a plurality of chain link members that define the passageway and each link member rotates about an axis that is substantially perpendicular to the transport axis.

29. The apparatus of claim 28 wherein each of the link members rotates about a substantially vertical axis.

30. The apparatus of claim 29 further including a deflector member mounted to the carrier assembly and forming a curved deflection surface having first and second ends proximate the stationary tongue member and the receiver member, respectively, the first end opening in a direction parallel to the transport axis, the deflection surface at least in part sloping toward the receiving space and opening at the second end to in a direction substantially perpendicular to the transport axis.

31. The apparatus of claim 30 wherein the receiver assembly further includes a substantially vertical second wall member that extends up from the first wall member and extends from the second end of the deflection surface along the length of the receiving space where the receiving space is on the same side of the second wall member as the tongue assembly.

32. A method for use with a carrier assembly including a flexible power cable, a wheel supported carrier member and a tongue assembly including a stationary member mounted to the carrier member and an extendable tongue member receivable within and extendable to a substantially fully extended position from the stationary member along a transport axis, a stationary port fixedly mounted with respect to the stationary member and a moveable port fixedly mounted to the extendable member such that the distance between the ports depends on the degree of extendable member extension, the cable linked at first and second ends to the stationary and moveable ports, respectively, a receiving space formed adjacent a first of the stationary and moveable ports and a corresponding first of the stationary and extendable members, the method for configuring the cable for storage when the tongue assembly is retracted, the method comprising the steps of:

with the tongue assembly in an extended configuration, arranging the cable to form a curve that is convex into the receiving space proximate a first of the cable ends; and substantially restricting cable bending between the curve and a second of the cable ends.

33. The method of claim 32 wherein the step of restricting includes providing a sheath member that that forms a passageway and that restricts bending to within a single plane and positioning the cable within the passageway.

34. The method of claim 33 wherein the step of providing a sheath member includes providing a chain link. assembly including chain links that rotate about axis that are substantially perpendicular to the transport axis.

35. The method of claim 34 wherein the step of providing includes providing the assembly where at least some of the chain links are restricted to rotating to a single side of adjacent link members.

* * * * *